(12) United States Patent
Fisher et al.

(10) Patent No.: US 11,192,408 B2
(45) Date of Patent: Dec. 7, 2021

(54) VIBRATION MINIMIZATION TOWING HITCH

(71) Applicant: Curt Manufacturing, LLC, Eau Claire, MI (US)

(72) Inventors: Benjamin D. Fisher, Eau Claire, WI (US); Curtis M. Bowe, Chippewa Falls, WI (US)

(73) Assignee: CURT Manufacturing, LLC, Eau Claire, WI (US)

( * ) Notice: Subject to any disclaimer, the term of this patent is extended or adjusted under 35 U.S.C. 154(b) by 207 days.

(21) Appl. No.: 16/534,808

(22) Filed: Aug. 7, 2019

(65) Prior Publication Data

US 2020/0047572 A1   Feb. 13, 2020

Related U.S. Application Data

(60) Provisional application No. 62/715,415, filed on Aug. 7, 2018, provisional application No. 62/805,443, filed on Feb. 14, 2019.

(51) Int. Cl.
*B60D 1/50* (2006.01)
*B60D 1/06* (2006.01)
*B60D 1/46* (2006.01)

(52) U.S. Cl.
CPC ............... *B60D 1/50* (2013.01); *B60D 1/065* (2013.01); *B60D 1/46* (2013.01)

(58) Field of Classification Search
CPC .................................. B60D 1/50; B60D 1/241
See application file for complete search history.

(56) References Cited

U.S. PATENT DOCUMENTS

| 2,878,036 | A |   | 3/1959  | Simmons |         |
|-----------|---|---|---------|---------|---------|
| 3,600,004 | A |   | 8/1971  | Newkirk |         |
| 3,731,950 | A |   | 5/1973  | Burcham |         |
| 4,211,427 | A |   | 7/1980  | Young et al. |    |
| 4,351,542 | A | * | 9/1982  | Lovell ...................... | B60D 1/50 |
|           |   |   |         |         | 267/138 |
| 4,773,668 | A | * | 9/1988  | Muonro ................... | B60D 1/50 |
|           |   |   |         |         | 267/138 |
| 4,817,978 | A |   | 4/1989  | James |           |
| 5,375,867 | A |   | 12/1994 | Kass et al. |     |

(Continued)

FOREIGN PATENT DOCUMENTS

| EP | 0022674 A1 | * | 1/1981 | ............... | B60D 1/50 |
| FR | 2678554 A1 | * | 1/1993 | ............... | B60D 1/28 |

(Continued)

*Primary Examiner* — Kevin Hurley
(74) *Attorney, Agent, or Firm* — Jeffrey D. Shewchuk; Shewchuk IP Services, LLC

(57) ABSTRACT

A vibration minimization towing hitch includes a shank attachable into the receiver tube the towing vehicle, and a separately formed head, such as for supporting a tow ball. The head is pivotable through a partial range of motion relative to the head, such as allowing the tow ball to pivot up to 7° downward or up to 3° upward. One or more compressible inserts are disposed in a pocket between the shank and the head, for resisting the limited pivotal motion of the head relative to the shank. A user performs a part of the assembly using two insertable pins or bolts, with insertion of the second pin compressing a compressible bumper which is separate from the insert(s).

20 Claims, 33 Drawing Sheets

(56) References Cited

U.S. PATENT DOCUMENTS

| | | | |
|---|---|---|---|
| 5,647,603 | A | 7/1997 | Kass et al. |
| 5,683,094 | A | 11/1997 | Gullickson |
| 5,823,560 | A | 10/1998 | Van Vleet |
| 5,873,594 | A | 2/1999 | McCoy et al. |
| 5,975,553 | A | 11/1999 | Van Vleet |
| 6,494,478 | B1 | 12/2002 | MacKarvich |
| 6,581,953 | B2 | 6/2003 | Jerry |
| 6,722,682 | B2 | 4/2004 | Valliere et al. |
| 6,834,879 | B1 | 12/2004 | Lorman |
| 6,913,276 | B1 | 7/2005 | Bauder |
| 7,025,370 | B2 | 4/2006 | Anderson et al. |
| 7,044,493 | B1 * | 5/2006 | Wilson ................... B60D 1/50 280/474 |
| 7,093,845 | B1 | 8/2006 | Fast |
| 7,152,870 | B2 | 12/2006 | Gurtler |
| 7,222,872 | B1 | 5/2007 | Bauder |
| 7,377,536 | B2 | 5/2008 | Rehme |
| 7,380,811 | B2 | 6/2008 | Rehme |
| 7,740,266 | B2 | 6/2010 | Marcy |
| 8,328,222 | B1 | 12/2012 | Roeber et al. |
| 9,505,281 | B1 | 11/2016 | Borkholder |
| 9,868,327 | B1 | 1/2018 | Borkholder |
| 10,183,536 | B2 | 1/2019 | McCoy et al. |
| 10,639,950 | B2 * | 5/2020 | Borkholder .............. B60D 1/52 |
| 2020/0031185 | A1 * | 1/2020 | Singh ....................... B60D 1/50 |

FOREIGN PATENT DOCUMENTS

| | | | | |
|---|---|---|---|---|
| GB | 2264474 | A * | 9/1993 | ............... B60D 1/50 |
| GB | 2266084 | A * | 10/1993 | ............... B60D 1/50 |

\* cited by examiner

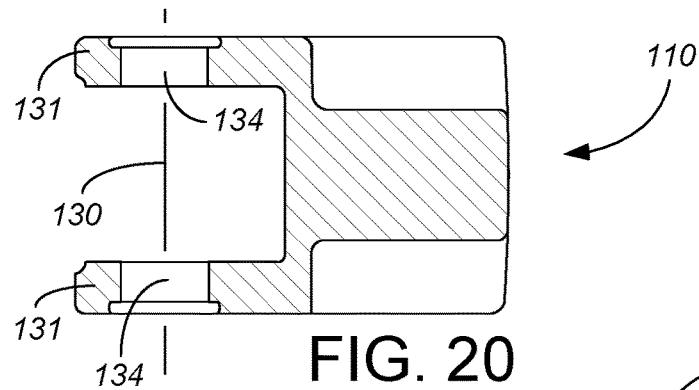
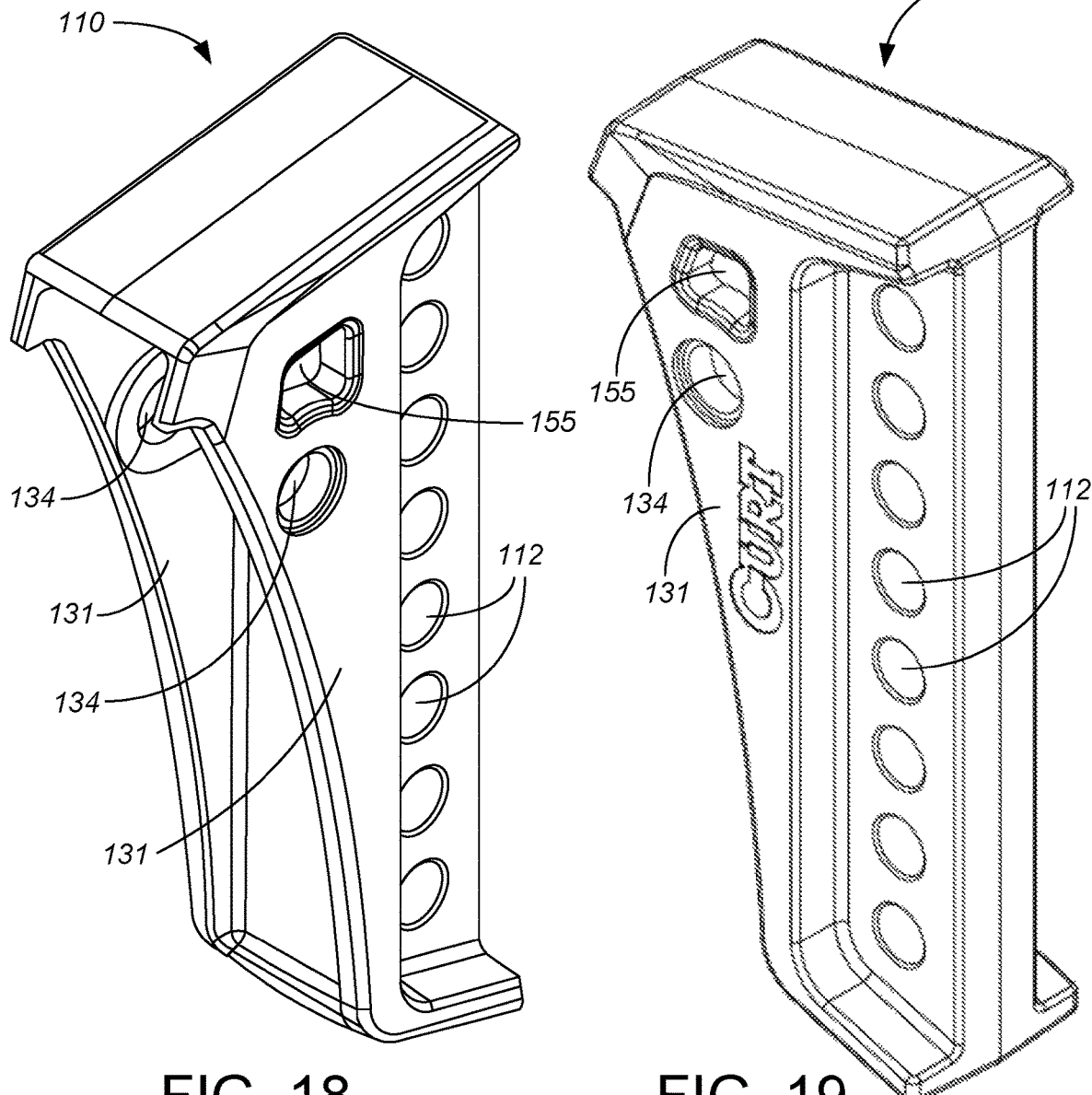
FIG. 18   FIG. 19   FIG. 20

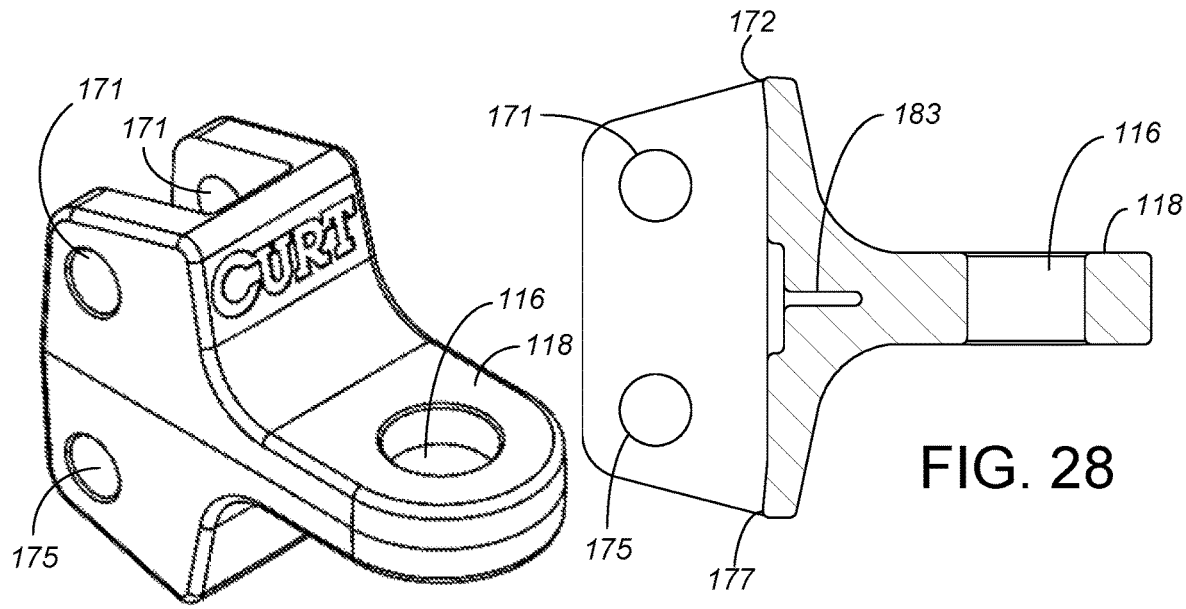
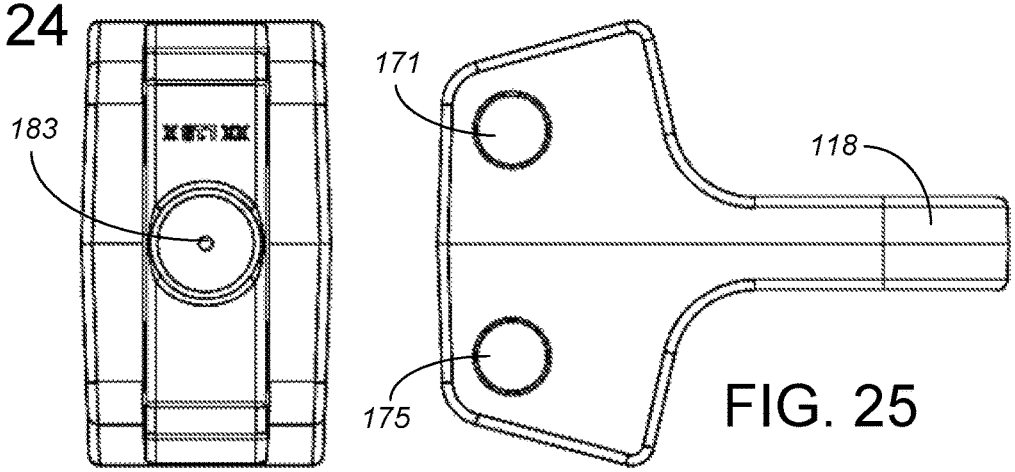
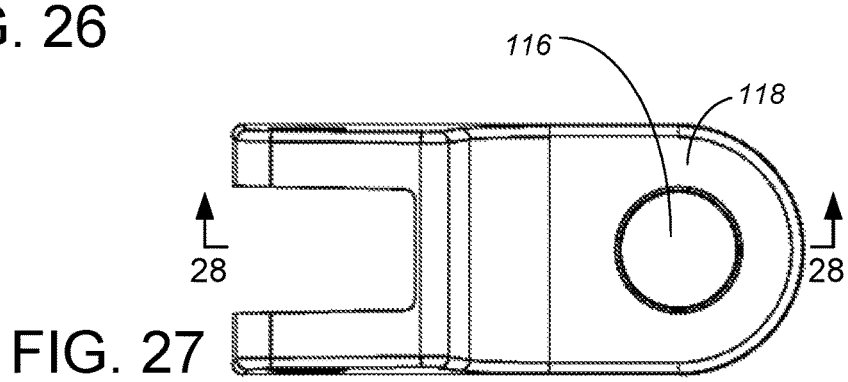

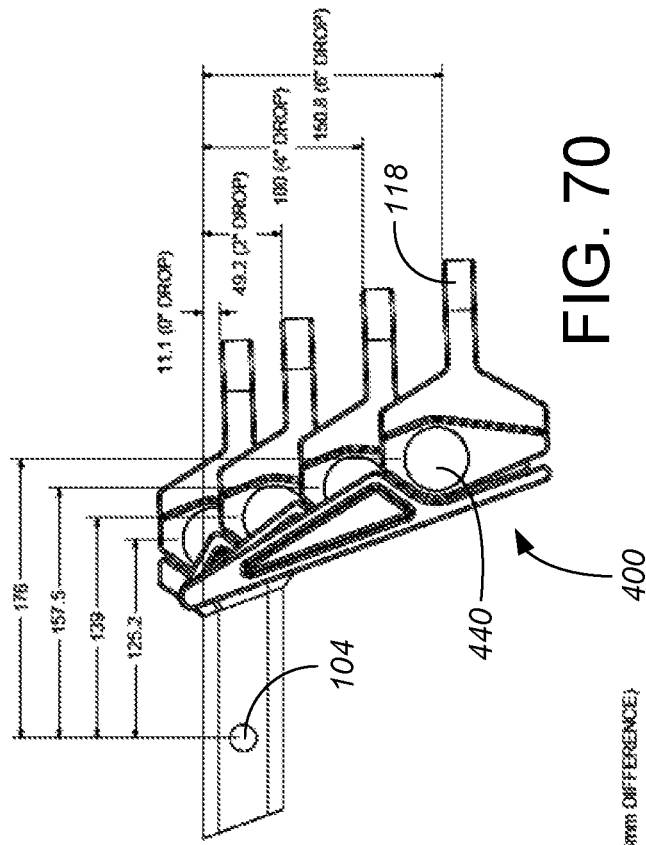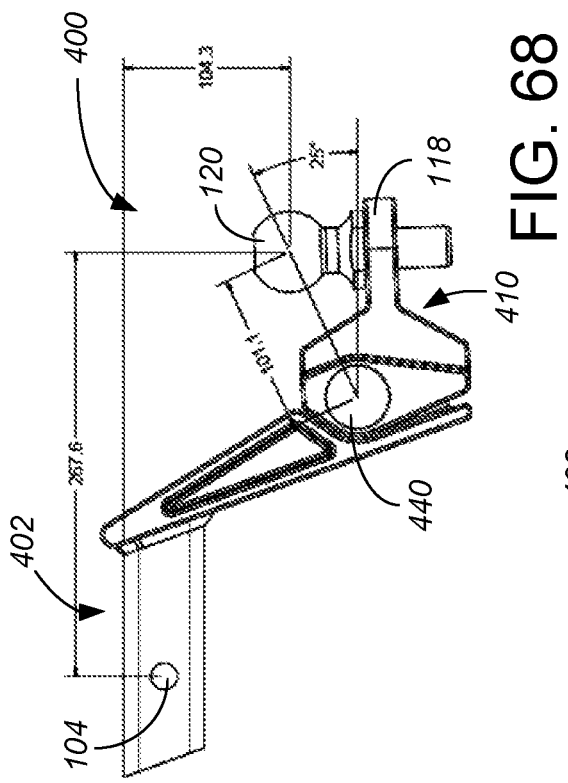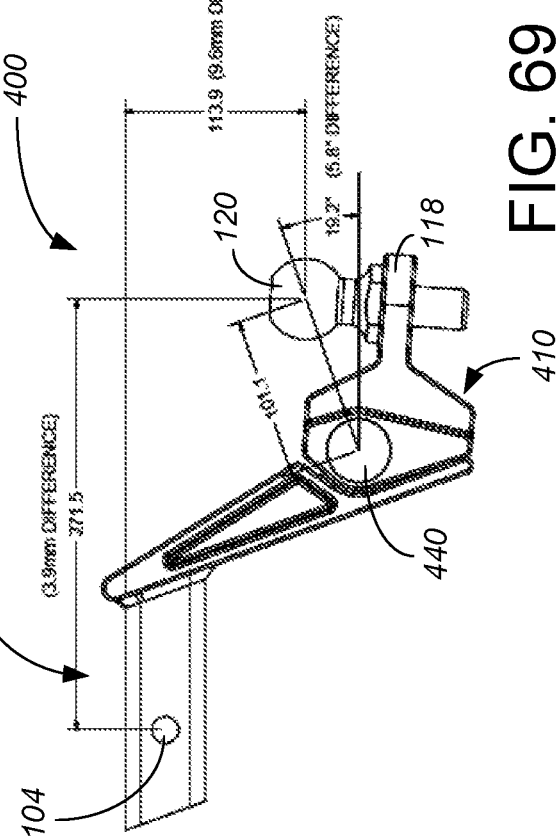
FIG. 68
FIG. 69
FIG. 70

VIBRATION MINIMIZATION TOWING HITCH

CROSS-REFERENCE TO RELATED APPLICATION(S)

The present application claims priority from U.S. Provisional Application No. 62/715,415 entitled VIBRATION MINIMIZATION TOWING HITCH filed Aug. 7, 2018, incorporated herein by reference. The present application also claims priority from U.S. Provisional Application No. 62/805,443 entitled COMPRESSIBLE ANTI-RATTLE TOW BUMPERS filed Feb. 14, 2019, incorporated herein by reference.

BACKGROUND OF THE INVENTION

The present invention is directed to the field of towing, and particularly to the structure to transmit towing force between a towing vehicle and a towed load. In this field, the issue of minimizing vibrations between the towed load and the towing vehicle, including minimizing jerk while towing and minimizing noise, vibration and harshness, is well known. Many solutions to the issue include using a spring and/or dampening member as part of the structure transmitting tow forces. Examples include U.S. Pat. Nos. 2,878,036, 4,773,668, 4,817,978, 5,823,560, 5,975,553, 6,581,953, 6,834,879, 7,093,845, 9,505,281 and 9,868,327, all incorporated by reference for their teachings of the problem and materials used for the functioning of the various components.

Several of these prior art hitches allow relative movement between the hitch and the hitch receiver and attempt to then dampen or provide a biasing spring force on such movement. However, this generally leaves the spring and/or dampening member exposed before or after installation into the hitch receiver, requiring the user to correctly position and attach the spring and/or dampening member relative to the hitch receiver. The hitch receiver on all vehicles is not exactly uniform, and the positioning and attaching of the spring and/or dampening member relative to the hitch receiver may be inconsistent as performed by the end user, leading to inconsistent spring or dampening forces from one installation to the next.

Several of these prior art hitches involve a sliding, linear movement causing compression or extension of the spring and/or dampening member, in an amount substantially equal to the amount of give or movement in the hitch. As a general statement, when involving such a length of movement, wear or deterioration of the spring and/or dampening member is likely to occur, leading to an unacceptable possibility of catastrophic failure.

Several of these prior art hitches involve a torsion force on the spring and/or dampening member. Like the long-length linear movement, the torsional forces tend to rapidly wear or degrade the spring and/or dampening member leading to an unacceptably short hitch product lifespan. Separately, if the spring or dampening member is based on compression of a polymer material, several of these prior art hitches unacceptably concentrate that compression on a specific, vulnerable area of the polymer material, leading to wear, degradation, and decrease in performance over time.

In some prior art hitches, there is equipment which is regularly assembled and disassembled, on multiple occasions, by the user, using two bolts or pins for the assembly and disassembly. Examples include the equipment taught in U.S. Pat. Nos. 3,600,004, 3,731,950, 4,211,427, 5,375,867, 5,647,603, 5,873,594, 6,722,682, 7,025,370, 8,328,222 and 10,183,536, all incorporated by reference. To speed the process of assembly or disassembly, the two bolts or pins are not threaded along their entire length, but rather have a substantial length (in some cases the entire length which is inserted into their hole) which has a smooth shaft. In general, in order for the user to be able to insert and remove the bolts or pins by axially sliding (rather than rotational, threaded advancement), there must be clearance between the smooth shaft and the mating hole. For instance, when using 20 mm diameter pins, a typical nominal (as designed) clearance might be 1 mm. Because there is a manufacturing tolerance on both the pin and the pin hole, this will commonly result in the actual clearance between the pin and the pin hole in the 0.5-1.5 mm range.

In these various examples, the two bolts or pins are horizontally disposed, withstanding the primary towing forces not in an axial tension force on the bolts or pins, but rather as one or more shear force imposed between aligned holes acting on the shafts of the bolts or pins. The primary towing forces include not only the tow force in the direction of travel of the towing vehicle, but also a vertical force of tongue weight. While the tow force changes direction frequently during towing as the towing vehicle accelerates and decelerates, the tongue weight stays much more consistent, such as pushing downward on a ball of the hitch and only very rarely (over very rough road or terrain) pulling upward on the ball of the hitch.

One detractor and common complaint for such equipment is that equipment makes excessive noise and rattles too much. The rattle is often worse when the equipment is unloaded, i.e., when not pulling a trailer or similar load. Many different types of anti-rattle structures have been proposed for various hitch equipment, but better solutions are needed.

Moreover, as a general statement, these prior art towing hitches are generally complicated and relatively expensive to manufacture. Better solutions are needed.

BRIEF SUMMARY OF THE INVENTION

The present invention is a towing hitch to transmit a towing force between a towing vehicle and a towed load. The towing hitch includes a shank attachable into the receiver tube the towing vehicle, and a separately formed head, such as for supporting a tow ball. In one aspect, the head is pivotable through a partial range of motion relative to the head. One or more compressible inserts are disposed between the shank and the head, for resisting the limited pivotal motion of the head relative to the shank. The insert is preferably protected within a pocket between the shank and the head. In another aspect, a user performs a part of the assembly using two insertable pins or bolts. A bumper formed of a compressible material is positioned so as to take up the play between the pins and their holes, asserting a biasing force after the user inserts the first pin so the user can insert the second pin.

BRIEF DESCRIPTION OF THE DRAWINGS

FIG. 18 is a front perspective view of the head of FIG. 13, shown without the identifying information or trademark on one of the ears.

FIG. 19 is a rear perspective view of the head of FIG. 13.

FIG. 20 is a horizontal cross-sectional view of the head of FIG. 13, taken along lines 20-20.

FIG. 24 is a rear perspective view of the tongue member of FIGS. 1-8 and 21-23, flipped over.

FIG. 25 is a side view (from the driver's side) of the tongue member of FIG. 24. The opposing side view (from the passenger's side) is a mirror image.

FIG. 26 is a front view of the tongue member of FIG. 25.

FIG. 27 is a top view of the tongue member of FIG. 25. The bottom view is substantially identical.

FIG. 28 is a cross-sectional view of the tongue member of FIG. 25, taken along lines 28-28.

FIG. 68 is a side view of another alternative embodiment of a vibration minimization ball mount towing hitch of the present invention in a rest position.

FIG. 69 is a side view of the towing hitch of FIG. 68 at a position of maximum downward deflection.

FIG. 70 is a side view of the towing hitch of FIGS. 68 and 69, relative to three additional embodiments, each embodiment having a different drop elevation.

Figure 1:
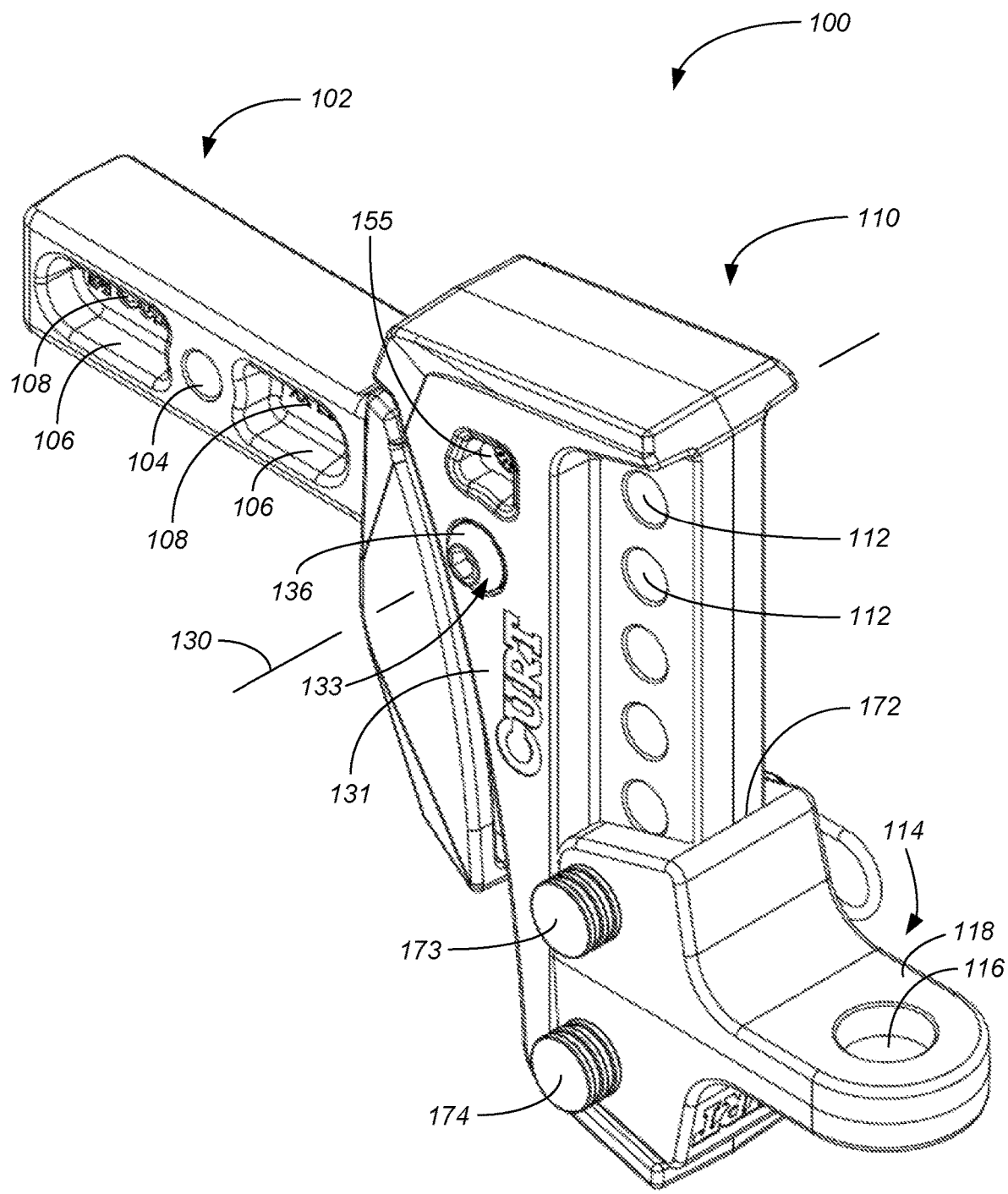
FIG. 1 is a rear perspective view of a preferred embodiment of a vibration minimization ball mount towing hitch of the present invention, assembled with the tongue member secured in the lowest elevational position.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

In the preferred configurations, one portion includes a shank (which can be a tube or can be solid) which mates inside a square, longitudinally-extending receiver tube mounted on the towing vehicle. The other portion includes a structure for mounting traditional hitching equipment, such as a hitch head, which subsequently supports a hitch tongue for a tow ball, for directly supporting a tow ball, or for supporting a weight distribution hitch including a tow ball. Instead of a hitch tongue for supporting a ball, other hitching structures as known in the art such as pintles, hooks and rings can alternatively be supported. The two portions are pivotally mounted to each other using a pivot pin such as a horizontally extending bolt, so the tow ball or other hitching point can pivot in an arc about the pivot axis and relative to the receiver tube.

FIGS. 1-28 thus detail a first preferred embodiment of a hitch 100 in accordance with the present invention, used to transmit a towing force between a towing vehicle (not shown) and a towed load (not shown). At its leading end, the hitch 100 includes a shank 102 which the user inserts into a square, longitudinally-extending receiver tube (not shown) mounted on the towing vehicle. In this embodiment, the shank 102 defines a 2"×2" profile, including a hitch pin hole 104 through the shank 102 to match the location of the hitch pin hole in a standard 2"×2" receiver tube. Thus the preferred hitch pin hole 104 is a nominal 17 mm throughhole with its axis about 80 mm from the proximal/trailing end of the shank 102. For the shank 102 to maintain its orientation relative to the receiver tube, the shank 102 extends distally beyond the hitch pin hole 104 a significant distance to match the depth of the standard receiver tube, such as having the axis of the hitch pin hole 104 about 88 mm from the distal/leading end of the shank 102. The shank 102 in the preferred embodiment shown in FIGS. 1-12 is cast from a strong metal such as 4140 alloy steel, with two recesses 106 on each side to lighten the weight of the shank 102 without significantly reducing its bending strength. If desired, indicia 108 such as the brand name, date or location of manufacture, or other identifying information can be included, preferably within the recesses 106 so as to be protected from contact with the receiver tube. Other alternative embodiments can have the shank 202 formed of solid metal without such recesses, or can have the shank 302 formed of hollow metal tubing 361 such as the embodiment of FIGS. 59, 60 and 67.

At its trailing end, the hitch 100 includes a hitch head 110. The preferred hitch head 110 includes a series of pin or bolt holes 112. The hole spacing, hole size and geometry of the hitch head 110 are made to fit standard weight distribution and other mounts such as tow ball tongue 118, dual tow ball 121, pintle mount 122, hook, ring, step mount, cargo carrier, bike rack, receiver tube mount, etc. For instance, in the preferred configuration, eight bolt holes 112 are used to provide six elevational positions. The user can select/adjust which of the elevations to mount a hitch tongue assembly 114, in accordance with the height-wise elevation best suited for mating with the elevation of the coupler (not shown) on any particular trailer or other towed load. The preferred hitch tongue assembly 114 is best shown and detailed in FIGS. 8 and 21-28, including a ball mount opening 116 in the tongue 118 for mounting a tow ball 120 such as the dual tow ball 121 shown in FIG. 23. As one alternative to having a ball mount opening 116, one or two balls could be welded on to the tongue 118. As another alternative to having a ball mount opening 116, the hitch head 110 can be used to mount the pintle mount base assembly 122 shown in FIGS. 29-30. The pintle mount base assembly 122 includes a flat, generally vertical surface 123 with four internally threaded bolt holes 124 for mounting of a pintle hitch (not shown) as known in the art.

Figure 2:
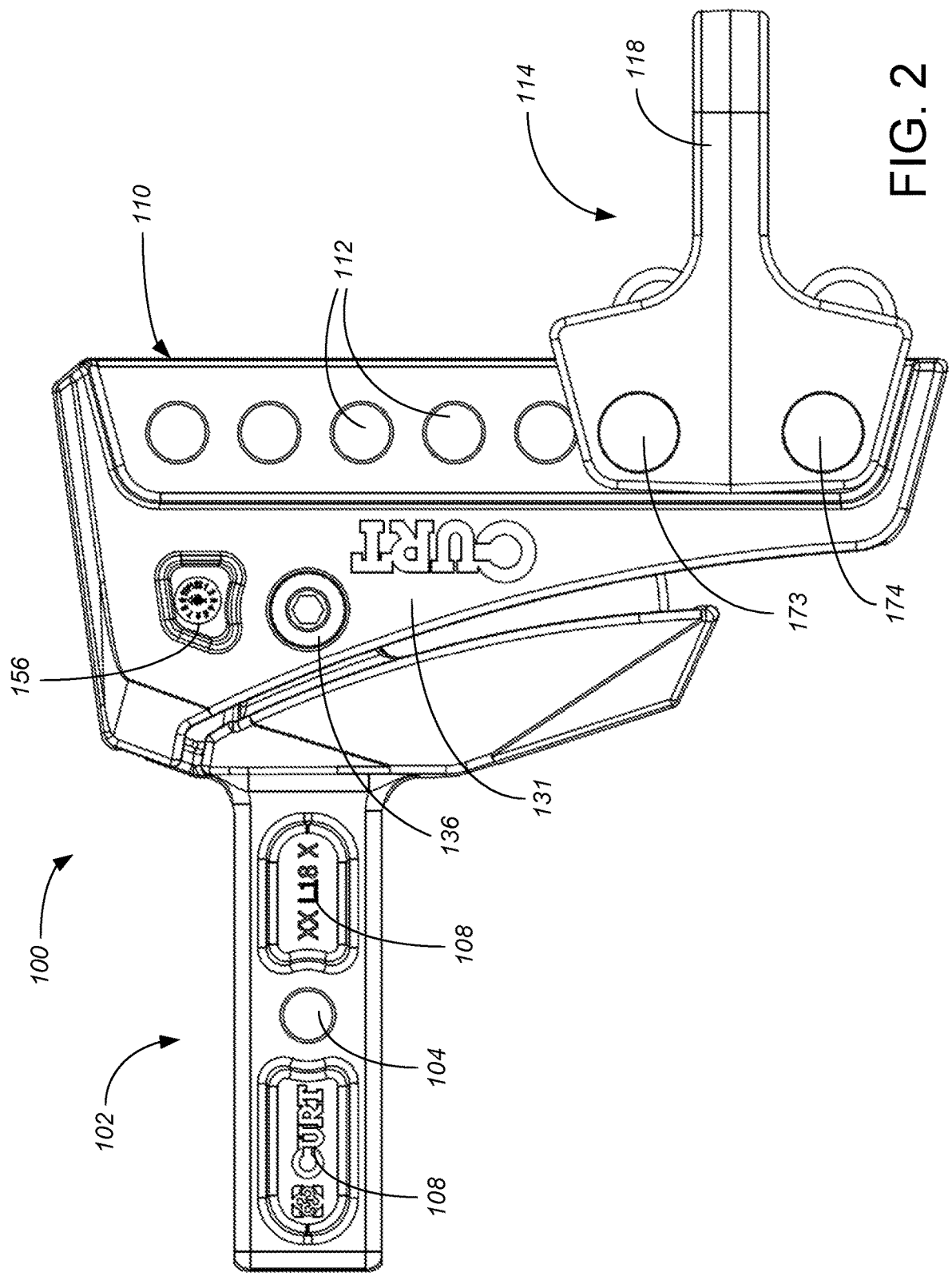
FIG. 2 is a side view (from the driver's side) of the towing hitch of FIG. 1.

The head 110 is pivotally mounted relative to the shank 102, for limited pivoting in either a clockwise direction or a counterclockwise direction (when viewed from the side) about a pivot axis 130 during towing. For instance, relative to a neutral position as shown in FIG. 2, the head 110 can pivot up to about 7° clockwise or up to about 3° counterclockwise before contact between the head 110 and the shank 102 limits further pivoting movement.

In the preferred embodiments best shown in FIGS. 14, 17, 18, 20 and 31, the head 110, 210 includes two ears 131, 231 which extend on opposing sides of a pivot pin hole 132 on the shank 102, 202 and the pivotal connection is provided by a pivot pin 133 extending through head pivot pin holes 134 through each ear 131, 231 as well as a shank pivot pin hole 132 on the shank 102, 202. An alternative but generally equivalent connection, exemplified by the embodiments of FIGS. 71-74, could be made using two ears 531, 631 with pivot pin holes 134 on the shank 502, 602 around a single pivot pin hole or dual pivot pin holes 138 on the head 510, 610. In broader terms, any sort of hinged or pivoting connection can be used to connect the head 110, 210, 310, 410, 510, 610 and the shank 102, 202, 302, 402, 502, 602. In the first preferred embodiment, the pivot pin 133 is provided by an internally threaded pivot sleeve 135, with two mating externally threaded button head pivot bolts 136, each of which can be formed of stainless steel for ease of installation at assembly, corrosion resistance and appearance. Washers 137 can be provided for each pivot bolt 136. For instance, the sleeve 135 can have a cylindrical outer diameter of about 22 mm, and a wall thickness of about 3 mm, internally threaded for 5/8-11 UNC 2B pivot bolts 136.

Preferably the pivot sleeve 135 has a portion 138 with a knurled outer surface aligning for contact against one of the ears 131. The knurled outer surface 138, such as having knurls which are about 0.8 mm greater in outer diameter, engages with the hole 134 through the ear 131 to prevent the pivot sleeve 135 from rotating relative to the head 110 during use of the hitch 100. By having the pivot sleeve 135 fixed relative to the head 110, the pivot bolts 136 have no tendency to lose torque and back out during use of the hitch 100. Alternative structures such as adhesives or keying could be equivalently used so the pivot pin 133 remains fixed during use of the hitch 100 relative to whichever part (shank 502, 602 or head 110, 210, 310, 410) provides the abutting surface for the bolt head 139, 239, 339, 439, 530. In the most preferred embodiment, in addition to the knurled outer surface 138, the pivot sleeve 135 is secured to the head 110 with an adhesive such as LOCTITE 263. LOCTITE 263 is ideal for dissimilar metals (such as stainless steel and zinc plated carbon steel), has a quick cure time, and can be removed with the application of heat.

Figure 59:
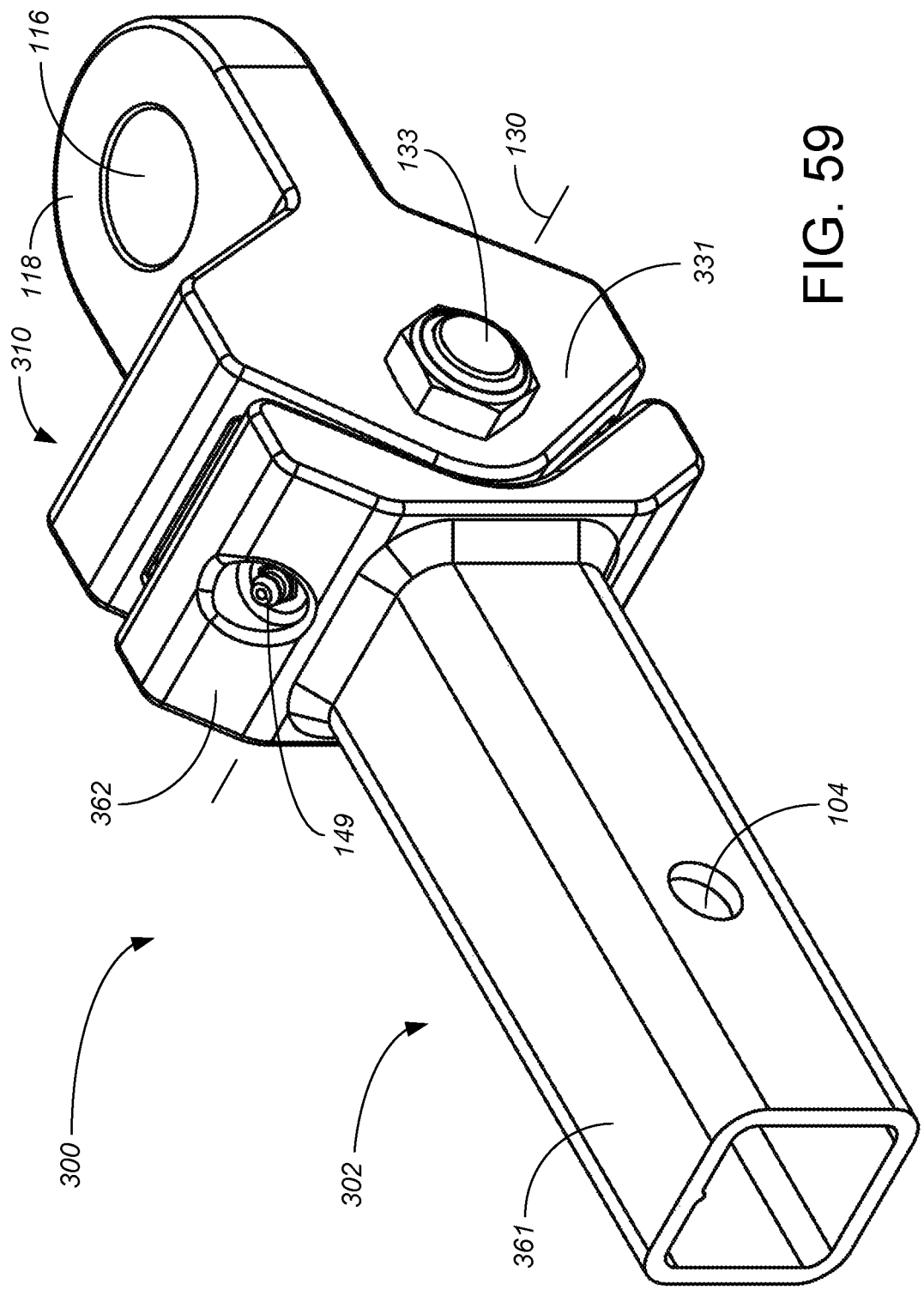
FIG. 59 is a front perspective view of an alternative embodiment of a vibration minimization ball mount towing hitch of the present invention.
Figure 60:
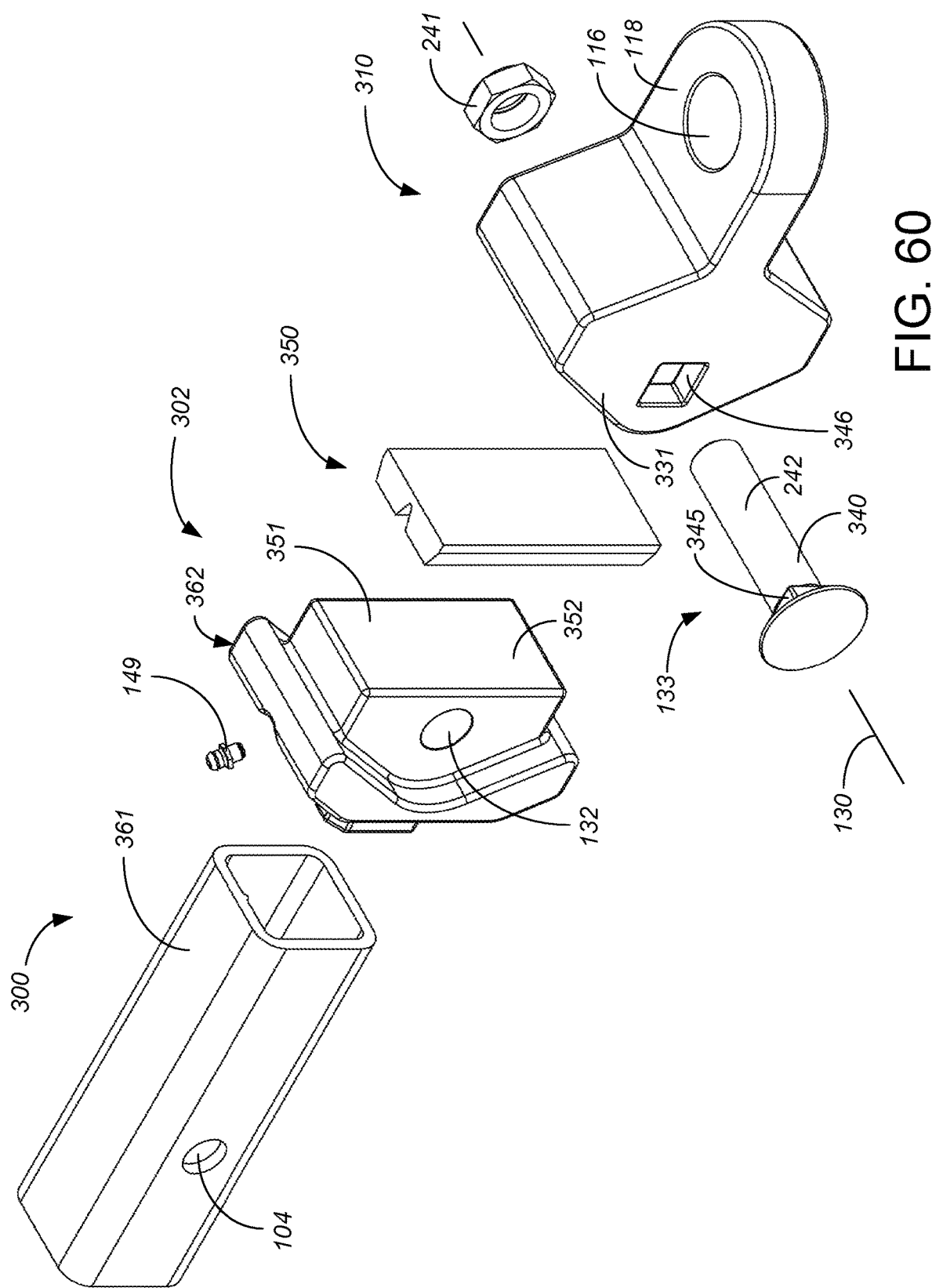
FIG. 60 is an exploded rear perspective view of the towing hitch of FIG. 59, illustrating the manufacturer assembling of the towing hitch.

In the alternative embodiments of FIGS. 31-37, 59-60 and 71-72, the pivot pin 133 is formed from a single stainless steel bolt 240, 340, 540. A nut 241 secures such bolts 240, 340, 440 in place, although the bolt threads 242 could alternatively be received in internal threads (not shown) provided in one of the ears 231, 331, 531. In the embodiment of FIGS. 31-37, the bolt 240 includes a standard hexagonal head 243 received in a hexagon recess 244 on the head 210, which prevents the bolt 240 from rotating with respect to the head 210. In the embodiment of FIGS. 59-60, the bolt 340 is a shoulder bolt and a square shoulder 345 on the bolt 340 mates into a square opening 346 through one of the ears 331.

Figures 73, 74:
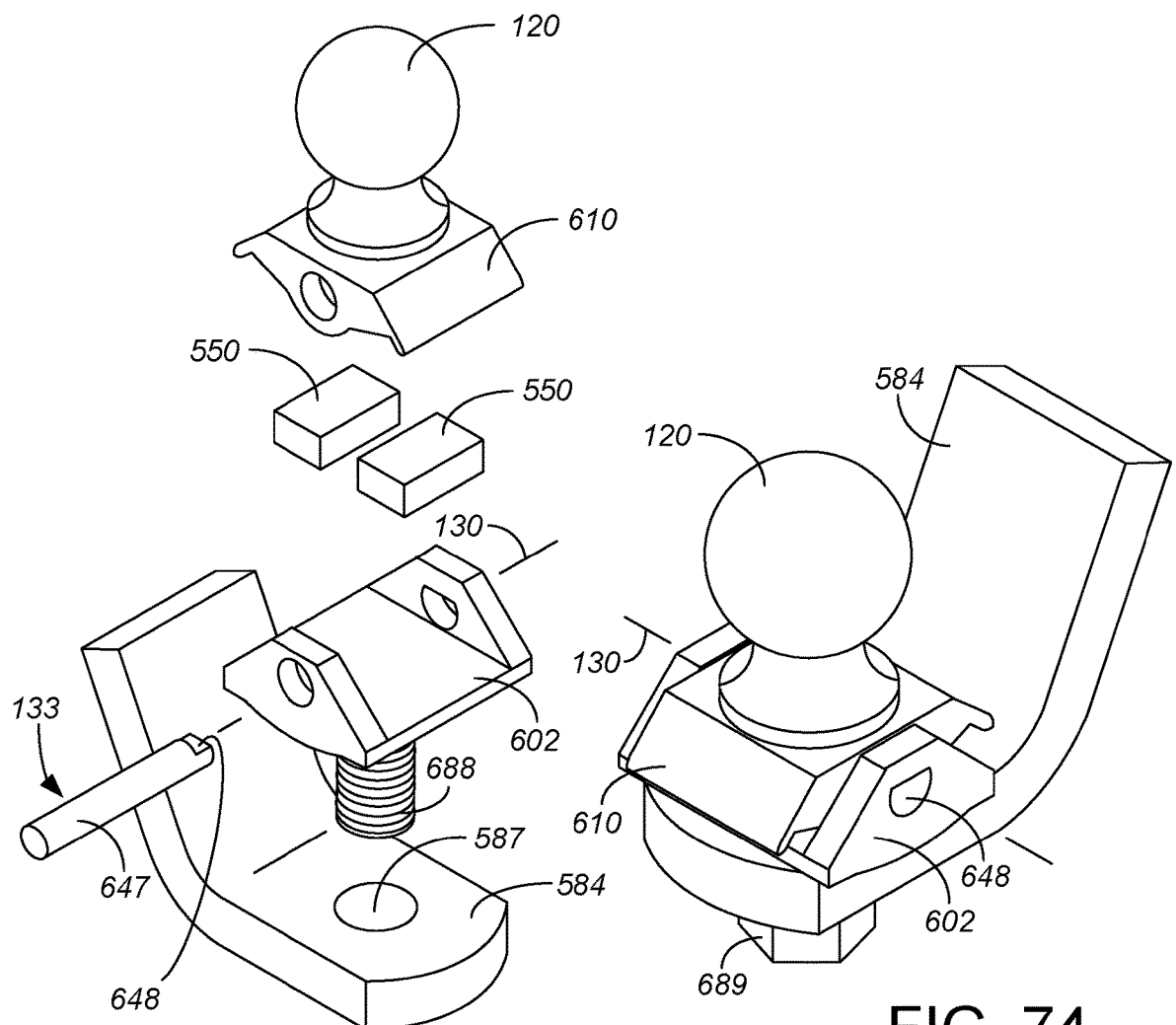
FIG. 73 is an exploded rear view of a vibration minimization ball mount towing hitch of the present invention having a different connection to the tongue.
FIG. 74 is a rear perspective view of the towing hitch of FIG. 73.

In the alternative embodiment of FIGS. 73-74, the pivot pin 133 is formed by a bar 647 which has no head, but instead can be received such as through a press fit into the corresponding ears 631 of the shank 602. The headless pivot bar 647 preferably includes a keyed end 648 having a shape that more strongly prevents the pivot bar 647 from rotating relative to the shank 602. If desired, a set screw (not shown) or similar structure can be used to secure the pivot bar 647 relative to the shank 602, such as downwardly directed in one of the ears of the shank 602 into the flat of the keyed end 648.

Figure 9:
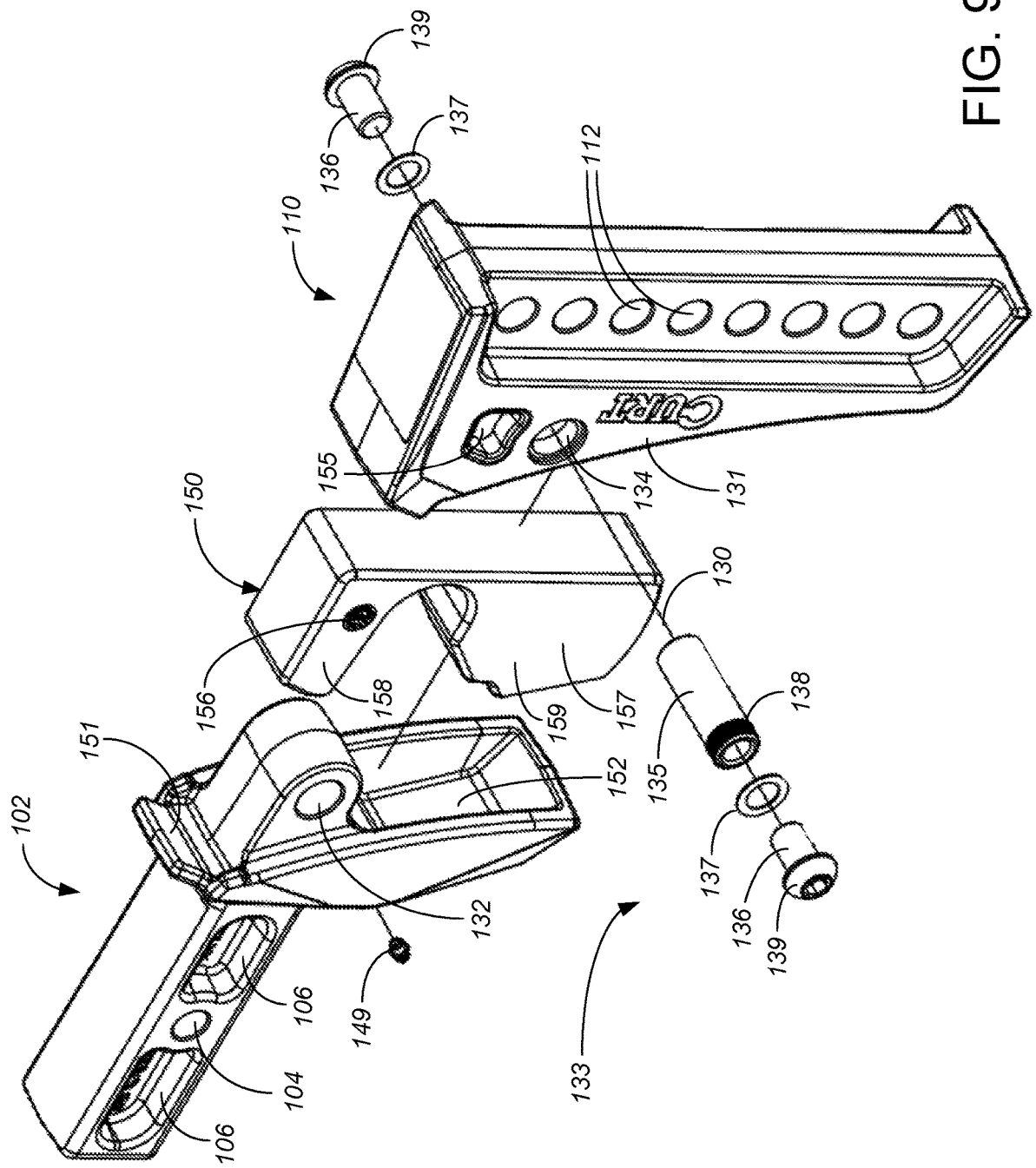
FIG. 9 is an exploded rear perspective view of the shank/head assembly of FIGS. 1-8, illustrating the manufacturer assembling of the shank/head assembly.
Figure 11:
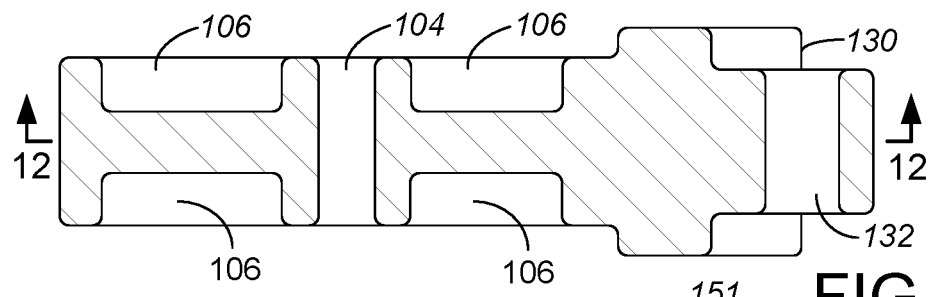
FIG. 11 is a horizontal cross-sectional view of the shank of FIG. 10, taken along lines 11-11.
Figure 10:
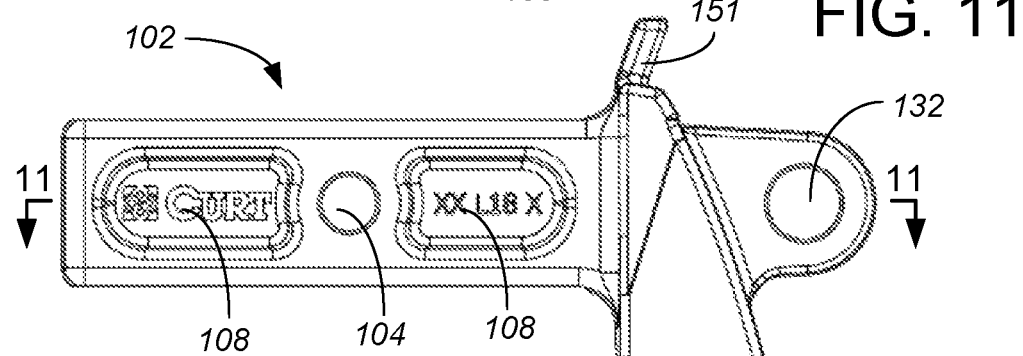
FIG. 10 is a side view of the shank of the towing hitch of FIGS. 1-7.
Figure 12:
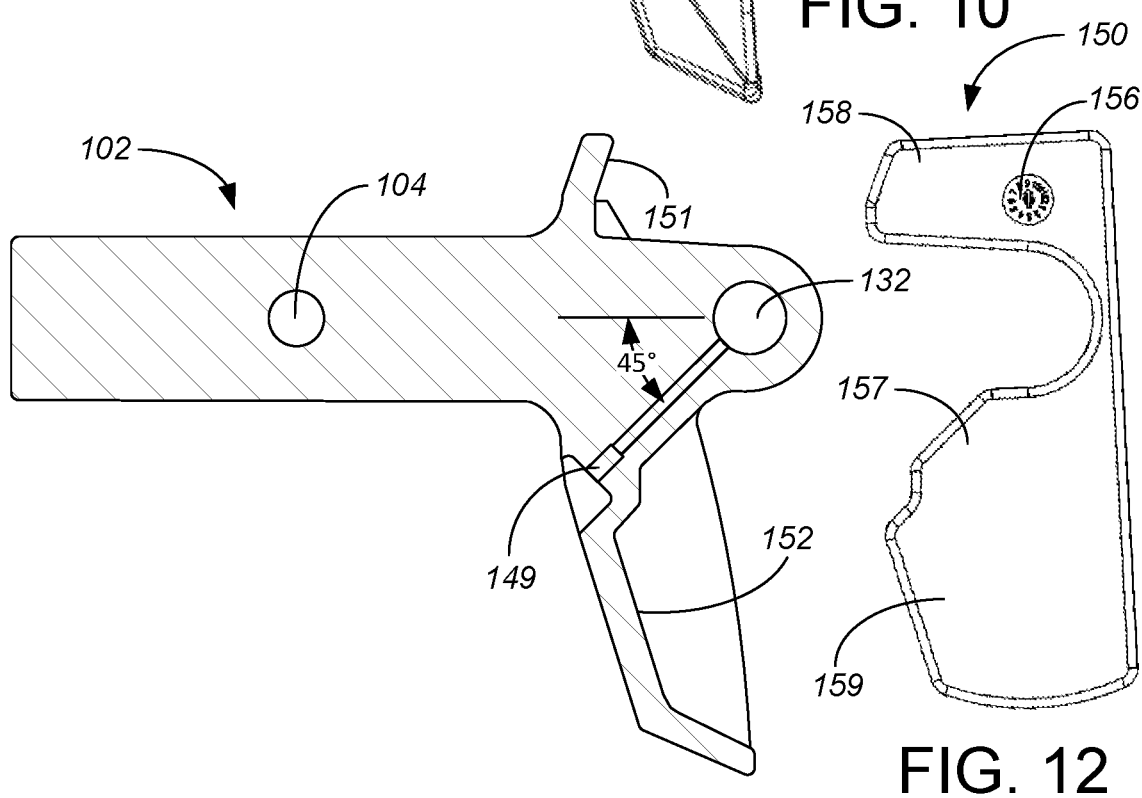
FIG. 12 is a vertical cross-sectional view of the shank of FIG. 10, taken along lines 12-12 in FIG. 11, and further showing a side view of the compressible insert oriented for mating into the pockets defined on the trailing, distal side of the shank.
Figure 16:
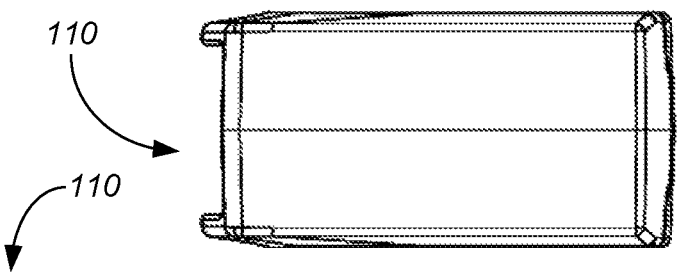
FIG. 16 is a top view of the head of FIG. 13.
Figure 14:
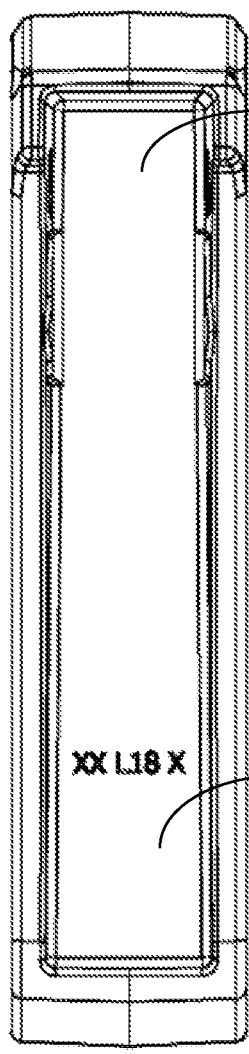
FIG. 14 is a front view of the head of FIG. 13.
Figure 13:
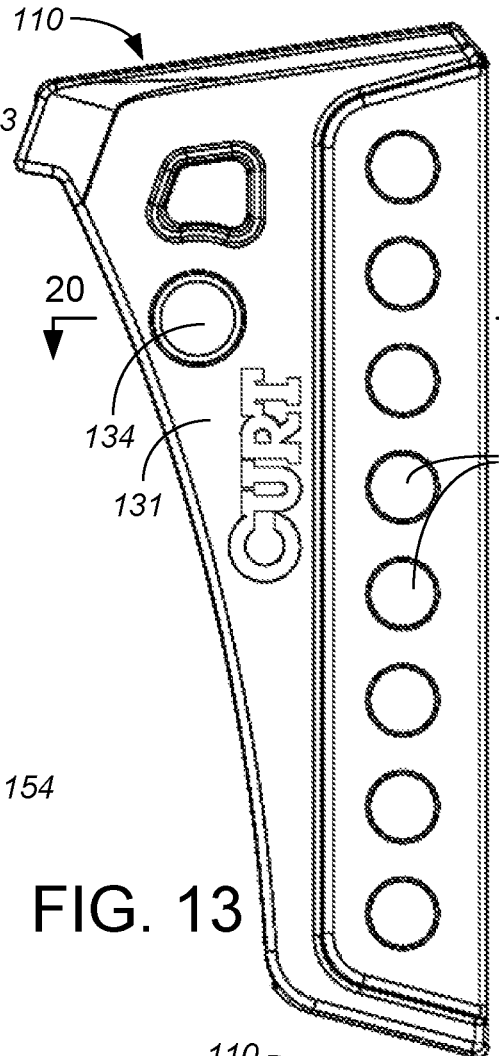
FIG. 13 is a side view (from the driver's side) of the head of the towing hitch of FIGS. 1-7.
Figure 15:
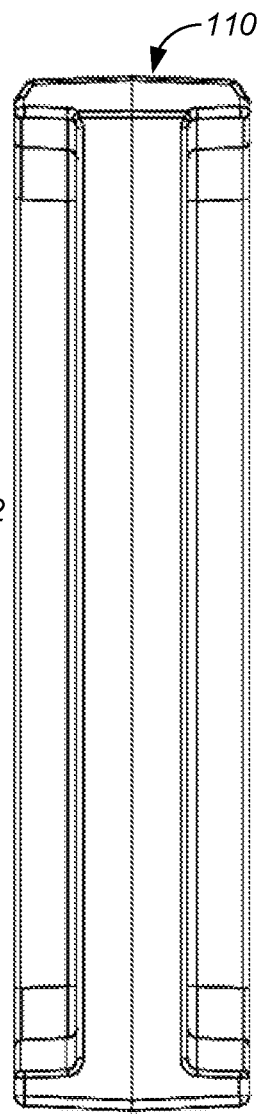
FIG. 15 is a rear view of the head of FIG. 13.
Figure 17:
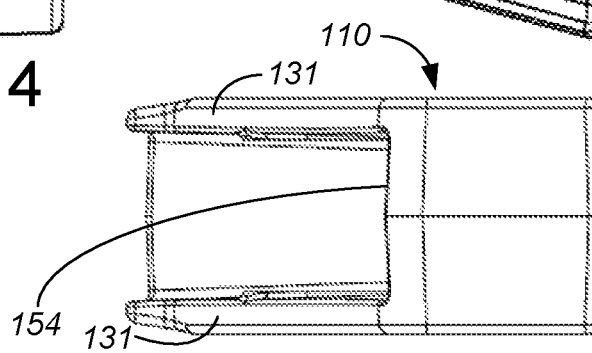
FIG. 17 is a bottom view of the head of FIG. 13.
Figure 21:
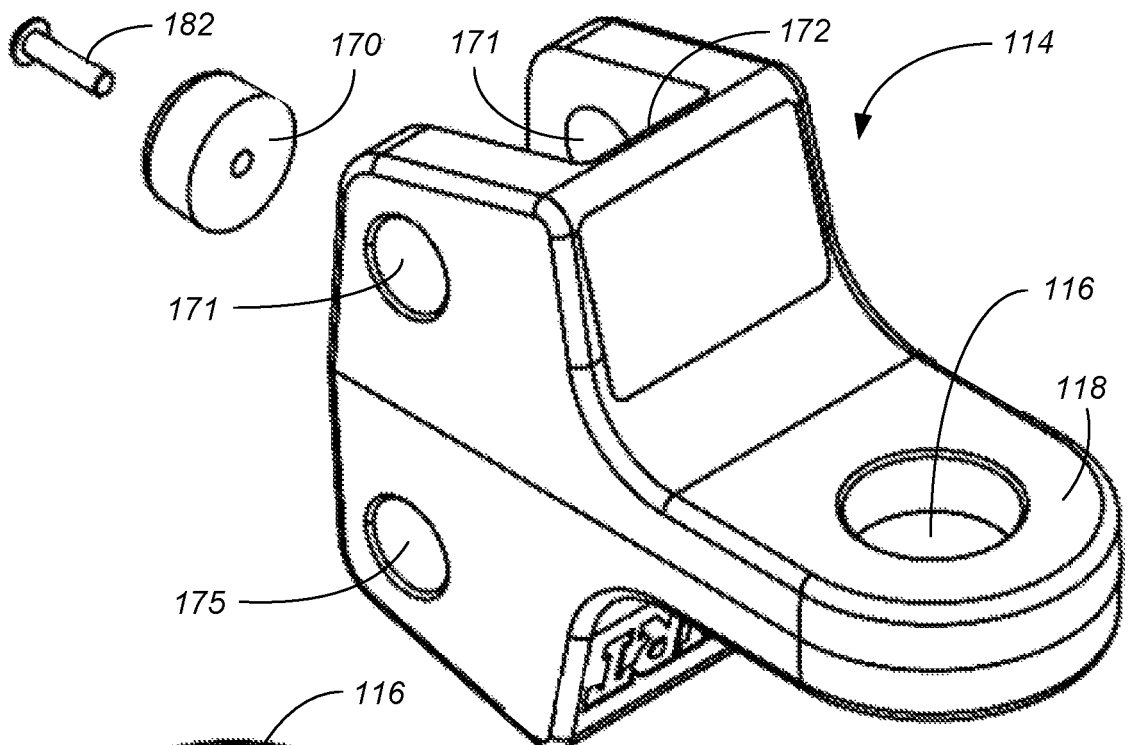
FIG. 21 is an exploded rear perspective view of the tongue assembly of FIGS. 1-8, illustrating the manufacturer assembling of the tongue assembly.
Figure 22:
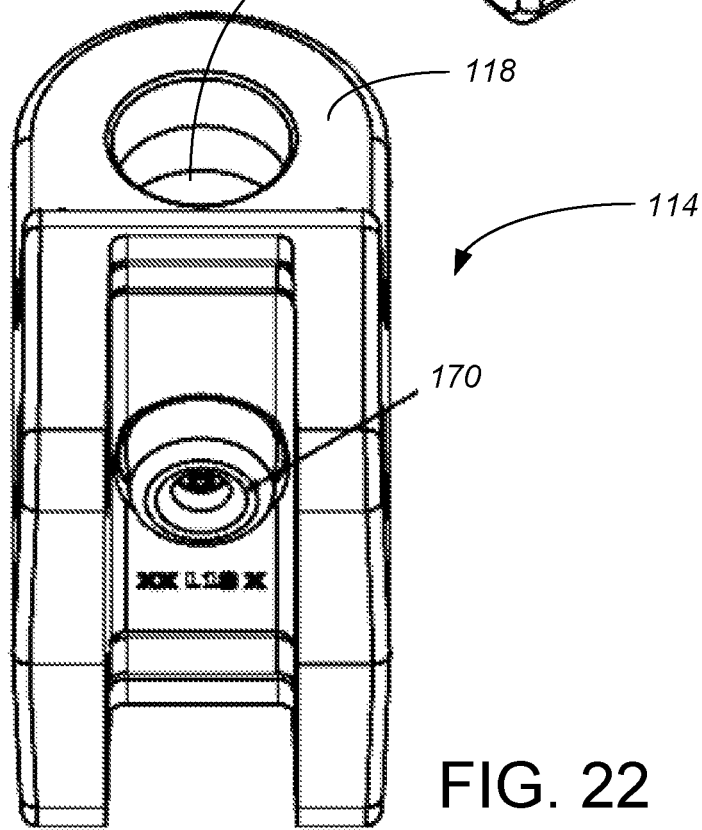
FIG. 22 is an angled downward front view of the tongue assembly of FIGS. 1-8 and 21.

Given that the pivot sleeve 135, bolt 240, 340, 540 or bar 647 or other pivot pin 133 remains fixed relative to either the head 110, 210, 310, 410, 510, 610 or the shank 102, 202, 302, 402, 502, 602 during use of the hitch 100, 200, 300, 400, 500, 600, a pivoting sliding motion occurs internally against one of the hole(s) 132, 134 through the head 110, 210, 310, 410, 510, 610 or shank 102, 202, 302, 402, 502, 602. For instance, in the first embodiment, the pivot sleeve 135 rubs against the inside surface of the hole 132 through the shank 102. To minimize friction associated with this pivoting, a grease zerk 149 is provided through the shank 102 in communication with the hole 132 for the pivot sleeve 135, as best shown in FIGS. 9 and 12. The grease zerk 149 lubricates the pivot point and the sides of the cavity defining surfaces which rub against each other whenever there is relative motion between the tow ball 120 and the shank 102.

Use of the detachable structure for the pivot pin 133 allows the resilient insert(s) 150, 250, 350, 550 to be readily changed for an appropriate durometer pad for a given hitch tongue weight of the towed load. Use of the detachable bolt 140, 240, 340, 540 for the pivot pin 133 also allows the resilient insert(s) 150, 250, 350, 550 to be readily replaced should it or they degrade due to time or excessive wear. In some embodiments, replacement of the pad(s) 150, 250, 350, 550 can be performed by the user. In other embodiments, the spacing between the shank portion 102, 202, 302, 402, 502, 602 and the head portion 110, 210, 320, 410, 510, 610 (i.e., the thickness dimension of the pocket), is smaller than the thickness of the pad(s) 150, 250, 350, 550, and the pad(s) 150, 250, 350, 550 must be pre-compressed during assembly. Such pre-compression involves significant compressive forces (hundreds or thousands of pounds) which can be professionally achieved with proper preloading equipment, but exceed the force which can be applied by hand to compress the pad(s) 150, 250, 350, 550. Similarly, releasing the knurled relationship, removal of the adhesive material, and/or releasing the press fit may require professional assistance to change between different pad(s) 150, 250, 350, 550 in the hitch 100, 200, 300, 400, 500, 600.

Figure 3:
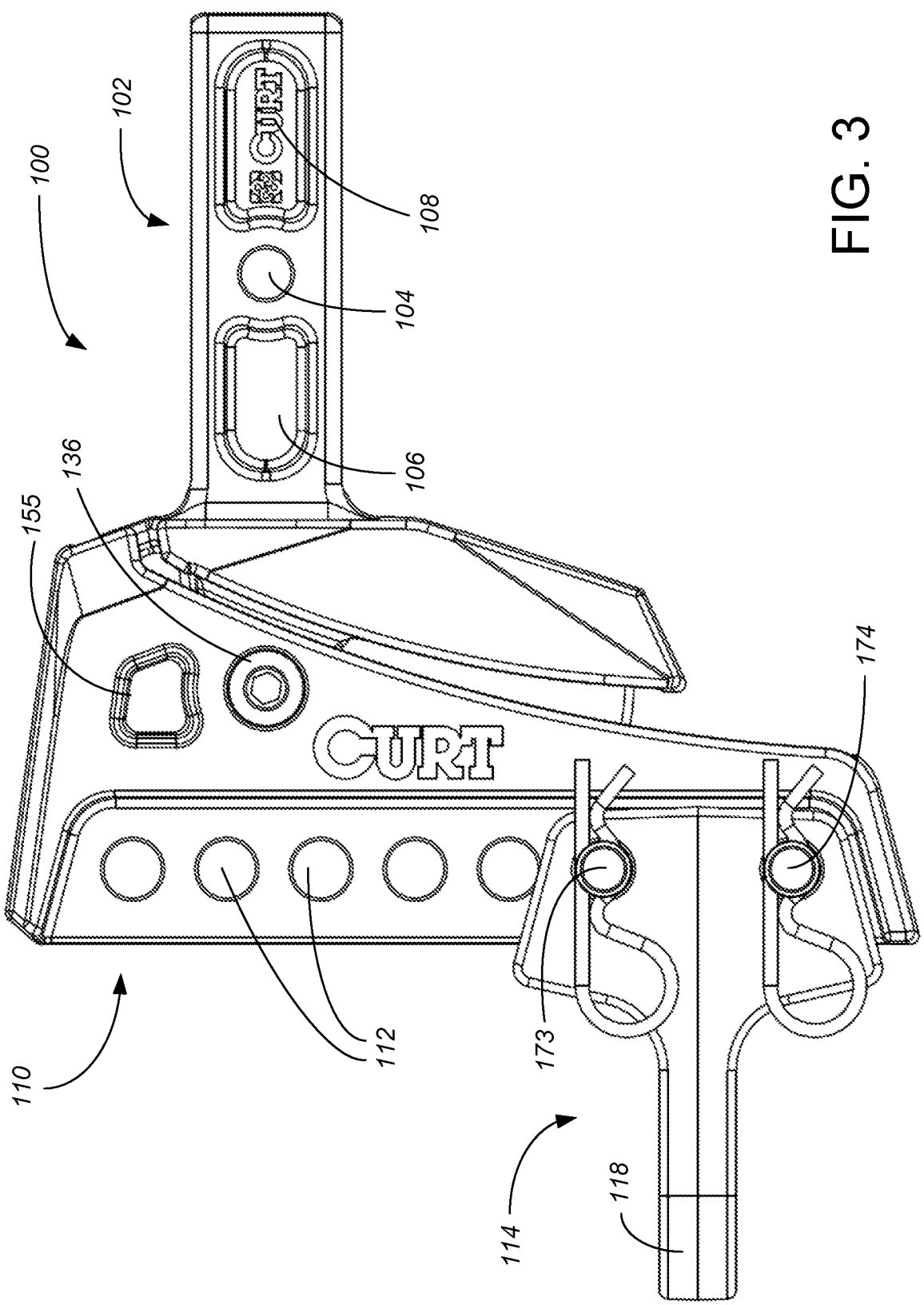
FIG. 3 is an opposing side view (from the passenger's side) of the towing hitch of FIGS. 1 and 2.
Figure 4:
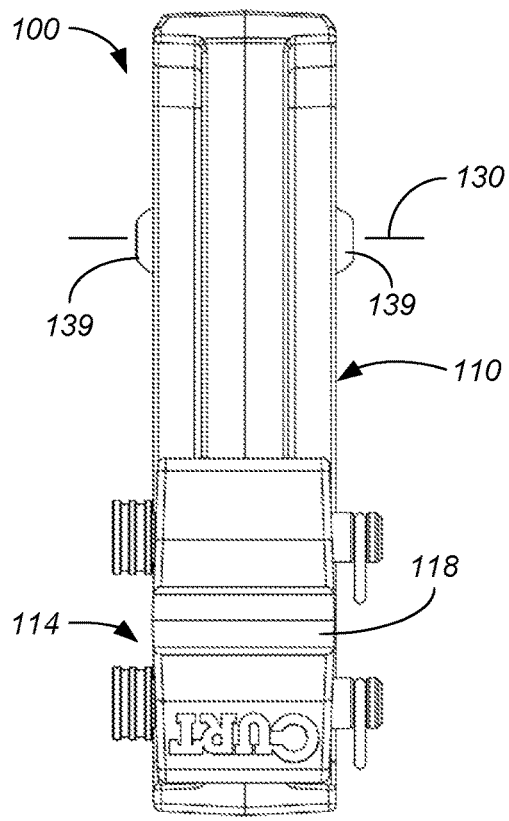
FIG. 4 is a rear view of the towing hitch of FIGS. 1-3.
Figure 5:
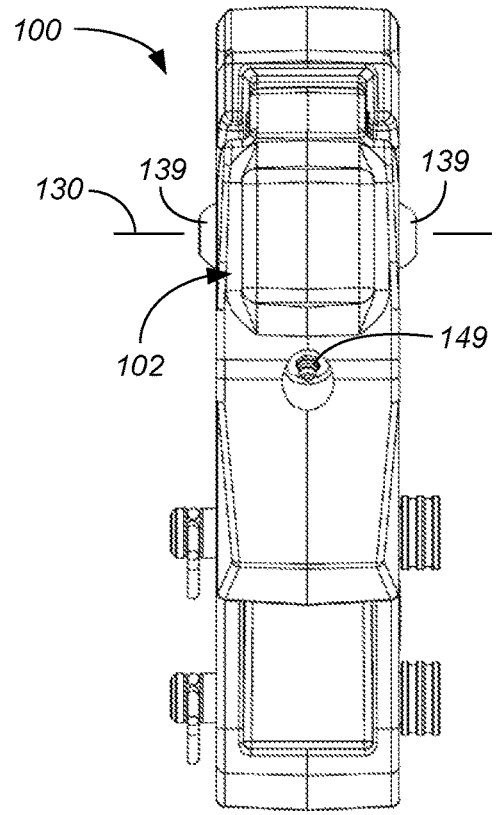
FIG. 5 is a front view of the towing hitch of FIGS. 1-4.
Figure 6:
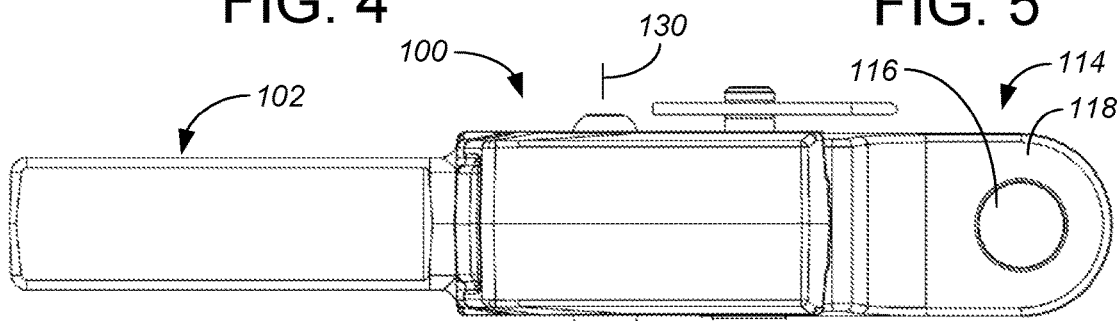
FIG. 6 is a top view of the towing hitch of FIGS. 1-5.
Figure 7:
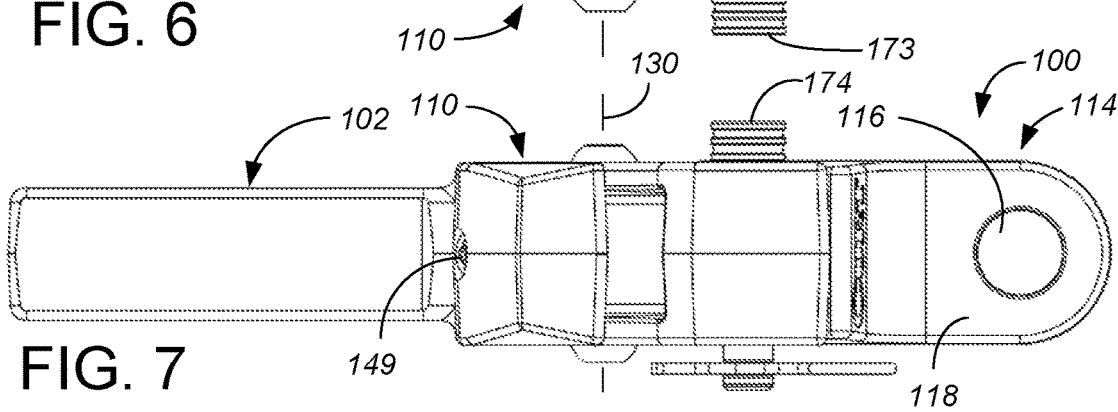
FIG. 7 is a bottom view of the towing hitch of FIGS. 1-6.
Figure 8:
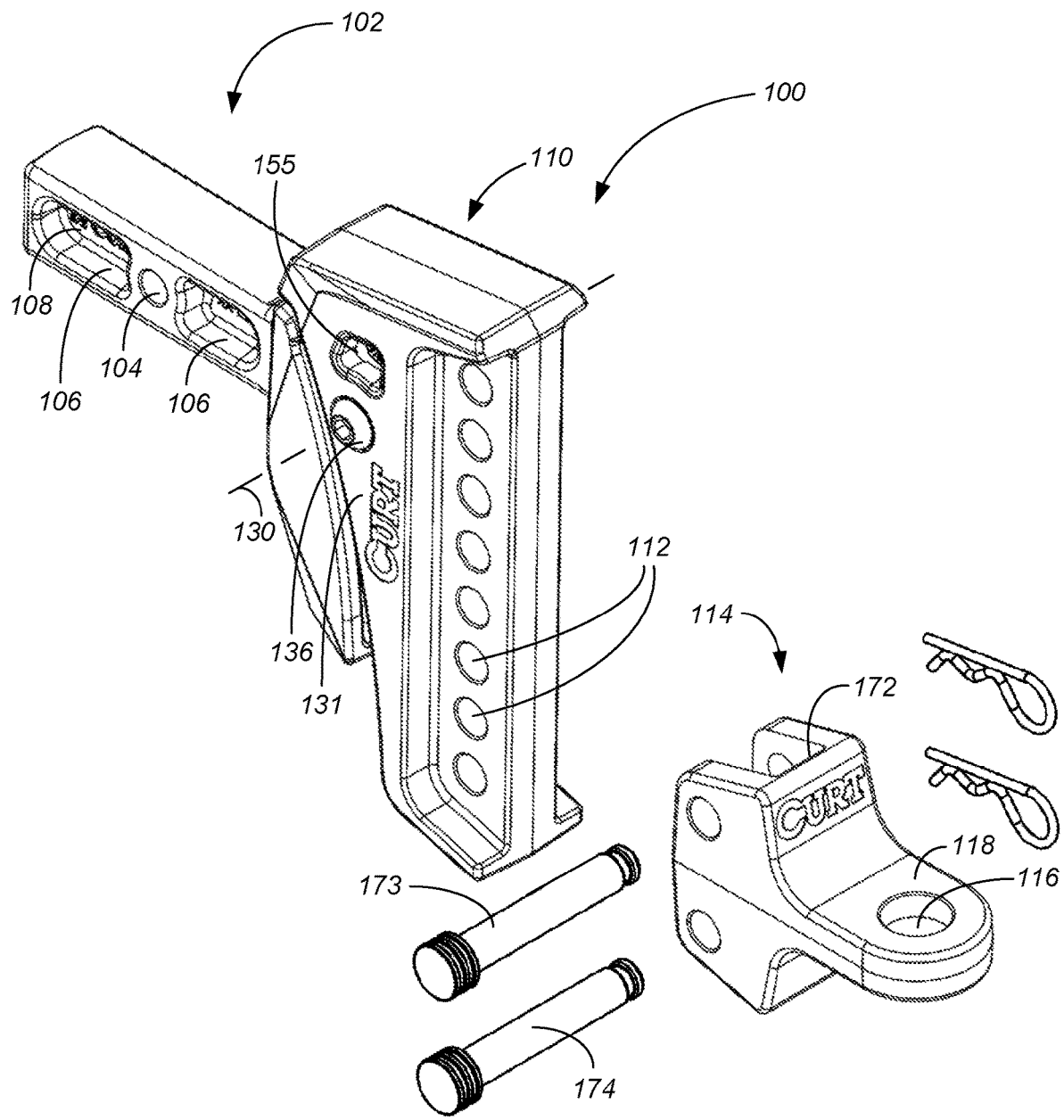
FIG. 8 is an exploded rear perspective view of the towing hitch of FIGS. 1-7, illustrating the user assembling of the tongue assembly of the towing hitch to the shank/head assembly.

A resilient insert 150, 250, 350, 550 is positioned between opposing surfaces on the shank 102, 202, 302, 402, 502, 602 and the head 110, 210, 310, 410, 510, 610. While alternative embodiments could be based on tensioning the resilient insert, the preferred embodiments compress at least a portion of the resilient insert 150, 250, 350 during pivoting motion of the head 110, 210, 310, 410, 510, 610 relative to the shank 102, 202, 302, 402, 502, 602. In the preferred embodiments, the resilient insert 150, 250, 350, 550 is one or more energy-absorbing, elastically deforming pad(s) disposed in a pocket. The shank 102 provides a first biasing surface 151 extending above the pivot axis 130 and a second biasing surface 152 extending below the pivot axis 130, both for contact with the pad 150. Likewise, the head 110 provides a third biasing surface 153 extending above the pivot axis 130 and a fourth biasing surface 154 extending below the pivot axis 130, both for contact with the pad 50. Pivoting of the head 110 relative to the shank 102 in one direction (counterclockwise as shown in FIG. 2, clockwise as shown in FIG. 3) compresses the insert 150 between the first biasing surface 151 and the third biasing surface 153, while pivoting of the head 110 relative to the shank 102 in the opposite direction (clockwise as shown in FIG. 2, counterclockwise as shown in FIG. 3) compresses the insert 150 between the second biasing surface 152 and the fourth biasing surface 154. In the first four preferred embodiments, each of these biasing surfaces 151, 152, 153, 154 extends generally vertically. But the important aspect is that each biasing surface 151, 152, 153, 154 extends significantly in a radial direction relative to the pivot axis 130 (i.e., not entirely circumferentially around the pivot axis 130), so the resilient insert(s) 150, 250, 350, 550 can be compressed between opposing biasing surfaces when pivoting occurs. The shape of the cavities in the shank 102 and in the head 110 as best shown in FIG. 12 were specifically designed to maximize the shape and volume of the pad 150 to achieve the desired force versus displacement characteristics, damping effect and wear resistance. The unusual shape of the insert 150 wraps around the pivot point 130. By having the insert 150 wrap around the pivot point 130, the hitch 100 can have a small horizontal separation (in the most preferred embodiment, only 61 mm) between the pivot point 130 and the line of eight pin attachment holes 112.

In the preferred embodiments, one side of the pad 150, 250, 350 (below the pivot axis 130) is compressed for the tow ball 120 to pivot downward, while a different side of the pad 150, 250, 350 (above the pivot axis 130) is compressed for the tow ball 120 to pivot upward. Using a single pad 150 extending around the pivot axis 130 helps to hold the pad 150 in place during assembly and use. The single insert 150, 250, 350 also helps to minimize movement of the insert 150, 250, 350 and avoid unwanted wear and abrasion, improving overall performance. Alternatively, the single resilient insert of the preferred embodiment could be replaced with two or more resilient inserts 550, as exemplified by the embodiments of FIGS. 71-72 and 73-74. In all embodiments, the shape of the pad(s) 150, 250, 350, 550, and particularly the sizes and angles that the biasing surfaces 151, 152, 153, 154 contact the pad(s) 150, 250, 350, 550, contribute to the compressive characteristics of the pad(s) 150, 250, 350, 550.

The resilient insert 150, 250, 350, 550 biases against movement of the tow ball 120 relative to the shank 102, 202, 302, 402, 502, 602. In the preferred embodiments, the resilient insert 150, 250, 350, 550 is disposed in a pocket which substantially shields the resilient insert 150, 250, 350, 550 at least from sunlight. The pocket between the shank 102, 202, 302, 402, 502, 602 and the head 110, 210, 310, 410, 510 which holds the resilient insert(s) 150, 250, 350, 550 is preferably formed so water or moisture will not accumulate therein. By shielding the insert 150, 250, 350, 550 from sunlight and avoiding water/moisture pooling, the life of the hitch 100, 200, 300, 400, 500, 600 is extended with minimal change over time to the pivoting performance of the hitch 100, 200, 300, 400, 500, 600.

The resilient insert 150, 250, 350, 550 is formed of a material substantially more compressible than the metals of the shank 102, 202, 302, 402, 502, 602 and the head 110, 210, 310, 410, 510, 610. The pad 150, 250, 350, 550 can be formed of a natural rubber material, but more preferably is formed of polyurethane. In selecting the durometer of the pad material, the pad shape, design load (tongue weight), and size and geometry all need to be factored in for each application. The preferred durometer is in the range of Shore 75 A to 95 A, with a most preferred durometer for the depicted embodiments being Shore 80 A±5 durometer with a tensile strength of 7,000-7,200 psi. To the extent possible, the pad material should retain a consistent durometer regardless of temperature, as towing using the invention is common with temperatures in North America ranging from about −40° F. in northern winters at night to about 110° F. or more in desert heat. In testing of the preferred pad 150 and shape of pocket shown in FIGS. 9 and 12, a Shore 80 A polyurethane insert 150 provides good force versus displacement characteristics for its wear resistance and durability. In contrast, testing of this pad/pocket shape using a Shore 75 A polyurethane material proved to be too soft and did not provide adequate resistance, while testing of this pad/pocket shape using a Shore 85 A polyurethane material started to get too hard and created issues with material fractures including fracture of the metal. Failure of the metal could be catastrophic and must be avoided.

Further, the shape of the insert 150, 250, 350, 550 is preferably cast rather than cut. The casting process allows for more control of the overall process, removing voids and bubbles particularly on the exposed surface of the pad 150, 250, 350, 550 and improving the integrity of the insert 150, 250, 350, 550. Custom casting also allows tighter control over the polyurethane recipe, vulcanization times, etc. to truly dial in the most beneficial properties of the insert 150, 250, 350, 550. In the preferred embodiment, a window 155 is positioned through the shank 102 to allow viewing of one particular area on the insert 50. As best shown in FIGS. 9 and 12, the preferred compressible insert 150 includes identifying information 156 thereon which can be viewed through the window 155, such as identifying the date of manufacture of the insert 150, the durometer of the insert 150, and/or the tongue weight rating of the insert 150. If the insert 150 is formed by casting or molding, the identifying information 156 can be an embossed part of the casting or mold. Otherwise the identifying information 156 may be printed on the insert 150 or included in a label adhered to the insert 50.

Figure 61:
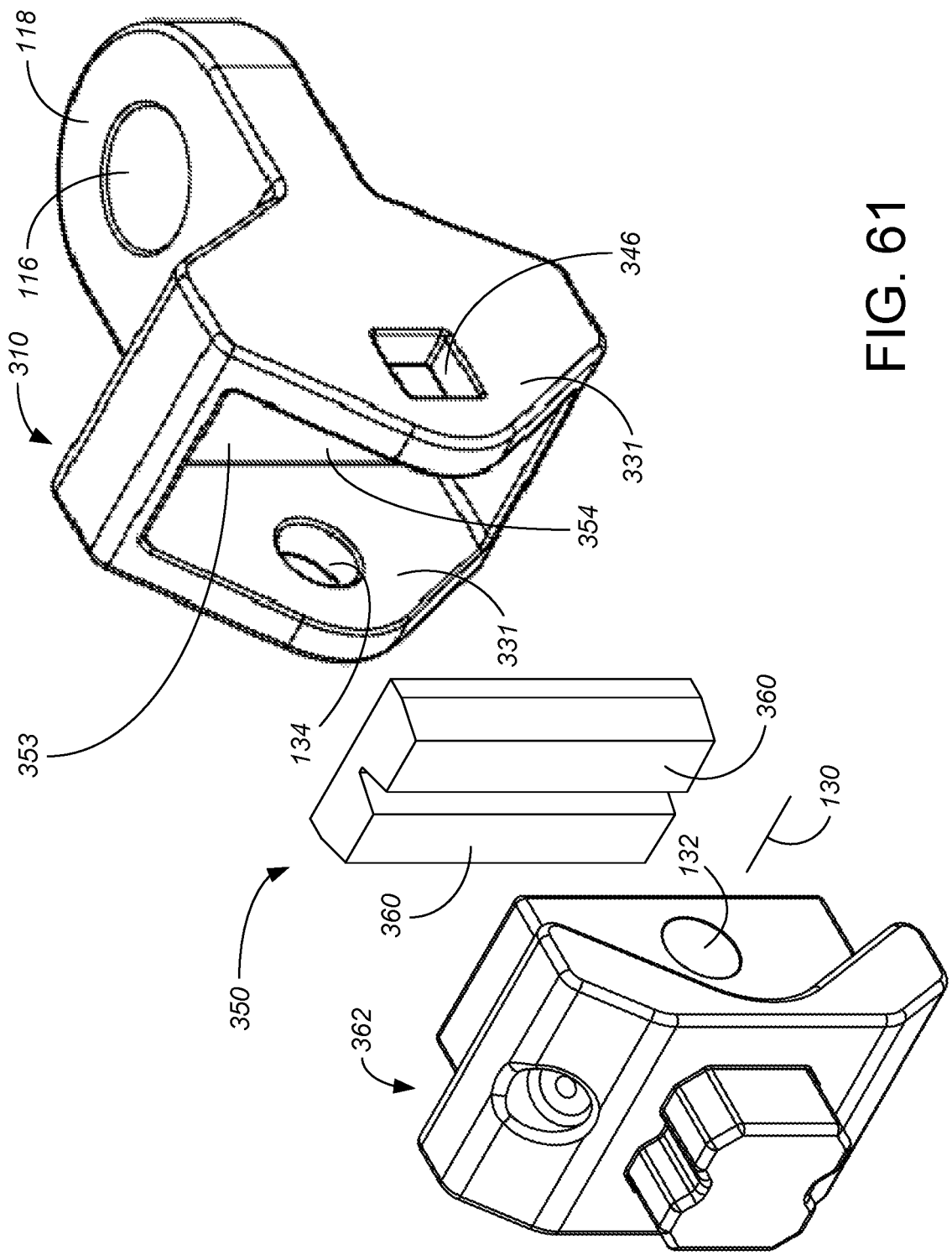
FIG. 61 is an exploded front perspective view of the shank plate, pad and head of the towing hitch of FIGS. 59 and 60.
Figure 64:
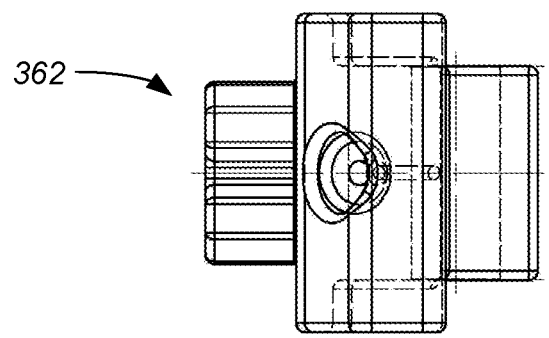
FIG. 64 is a top view of the shank plate of FIGS. 59-63.
Figure 63:
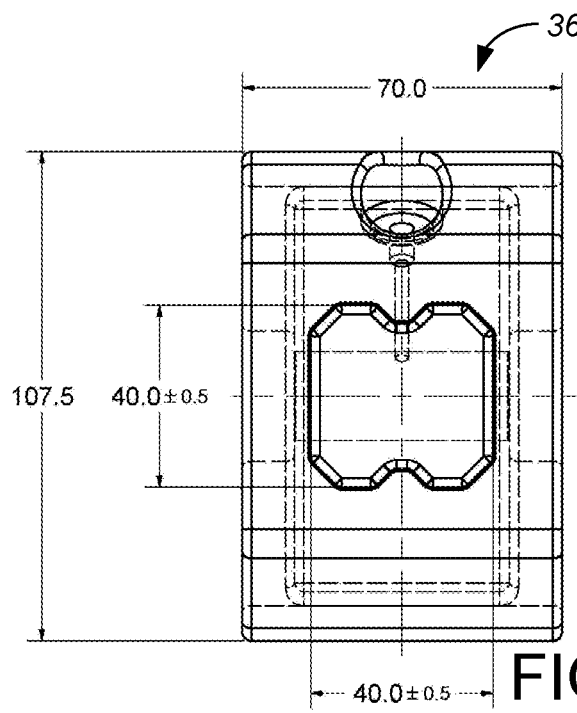
FIG. 63 is a front view of the shank plate of FIGS. 59-62.
Figure 62:
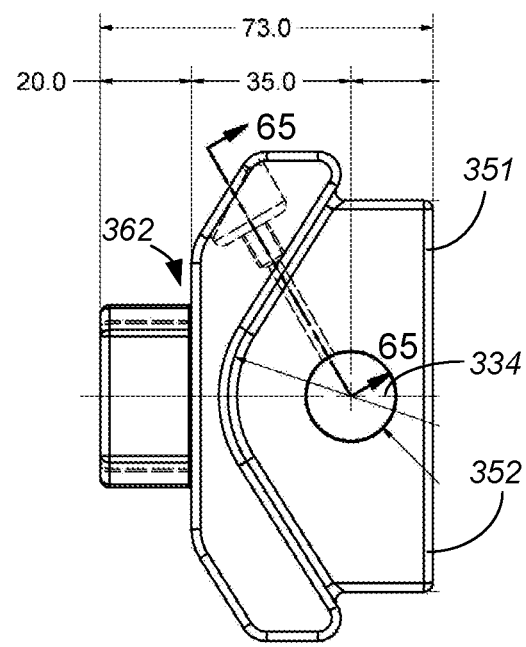
FIG. 62 is a side view of the shank plate of FIGS. 59-61.
Figure 65:
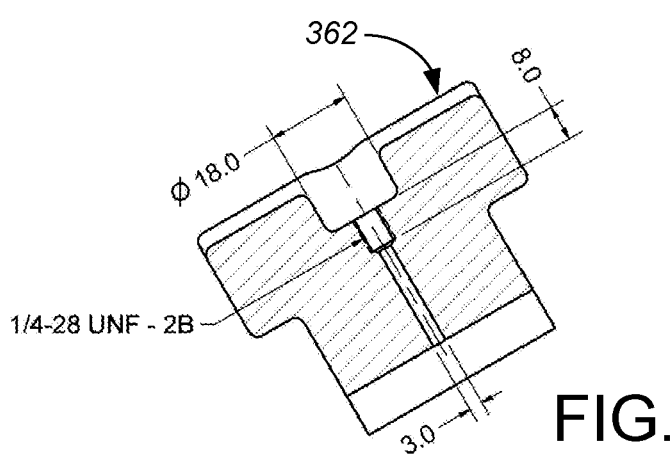
FIG. 65 is a cross-sectional view of the shank plate of FIGS. 59-64, taken along lines 65-65 from FIG. 62.

The shape, size, and durometer of the pad 150, 250, 350, 550 will all affect the shock absorption. The shape of the insert 150, 250 need not be the same for the clockwise compression as for the counterclockwise compression. The pad 150 best shown in FIGS. 9 and 12 has a generally constant width between its side faces 157 of 45 mm, but a relatively complex thickness profile in the direction of compression. As one alternative, the embodiment of FIG. 31 includes a differently shaped insert 250 disposed in a rectangular prism pocket. The alternative insert 250 includes a top section 258 which has a rectangular cross-section and a bottom section 259 which has a trapezoidal cross-section. The trapezoidal cross-section 259 allows a place for the deforming material to go during compression or load. As another alternative, the insert 350 of FIGS. 60 and 61 includes two side-by-side trapezoidal sections 360, allowing bulging when the insert 350 is deformed during compression. The constant thickness pad shape of other preferred embodiments, such as the inserts 550 of FIGS. 71-74, gives the deforming material less space to "squish" out and relies more strictly on compression of the material. Different durometers of the insert material will also affect the amount of force it takes to compress and the smoothness of the compression. This all applies to the length of pad 150, 250, 350 above and below the pivot axis 130 as well, i.e., the lengths, widths and angles of the four biasing surfaces 151, 152, 153, 154 affect the amount of force it takes to compress and the smoothness of the compression.

While the preferred pads 150, 250, 350, 550 are solid, alternative pad geometries include one or more hollow cavities (not shown) within the pad. In general, substantially all of the force on the preferred solid pads 150, 250, 350, 550 places the pad 150, 250, 350, 550 in compression with little or no shear. The addition of hollow cavities would allow more energy absorption due to shear deformation of the pad, but such shear would also contribute to worse wear characteristics for the pad. To the extent possible, the preferred designs attempt to minimize degradation of the pad 150, 250, 350, 550 such as protecting the pad 150, 250, 350, 550 from sunlight and protecting the pad 150, 250, 350, 550 from the possibility of contact with a sharp object, so the durometer of the pad 150, 250, 350, 550 remains consistent over years of use.

In preferred embodiments, the pivoting radius of curvature through which the tow ball 120 moves (i.e., the distance between the center of the ball 120 and the pivot pin axis 130) is within the range 2.5 to 24 inches, with weight distribution hitch usage generally having a greater pivoting radius of curvature. The pivoting radius of curvature through which the tow ball 120 moves determines the moment arm for the force applied to the ball 120 by the trailer which compresses the pad 150, 250, 350, 550. More preferably the pivoting radius of curvature through which the tow ball 120 moves is within in the range of 3 to 11 inches. For embodiments where the elevation of the tow ball 120 is selectable, the most preferred distance between the center of the tow ball 120 and the pivot axis 130 is in the range of about 7.5 to 8.5 inches depending upon the elevation selected by the user as called out in FIG. 33. For embodiments where the elevation of the tow ball 120 is set such as the embodiments shown in FIGS. 58-61, the four embodiments shown in FIG. 70, the embodiment of FIGS. 71-72 and the embodiment of FIGS. 73-74, the most preferred distance between the center of the tow ball 120 and the pivot axis 130 is in about 4 inches as called out on FIG. 69.

Figure 67:
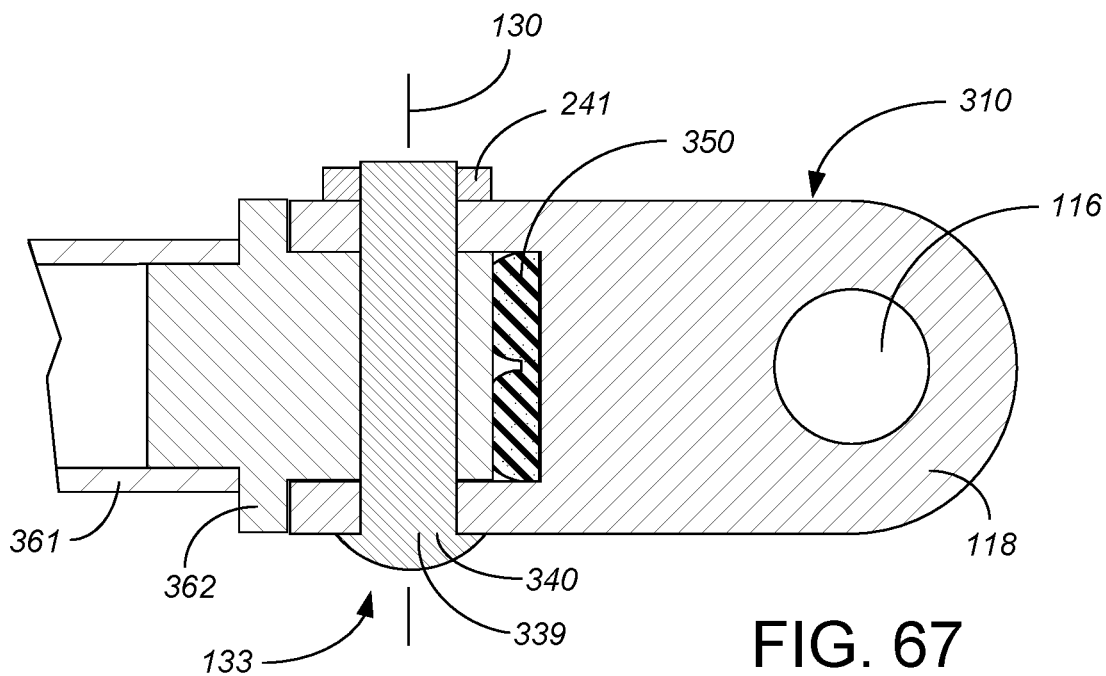
FIG. 67 is a horizontal cross-sectional view of the towing hitch of FIG. 59.
Figure 66:
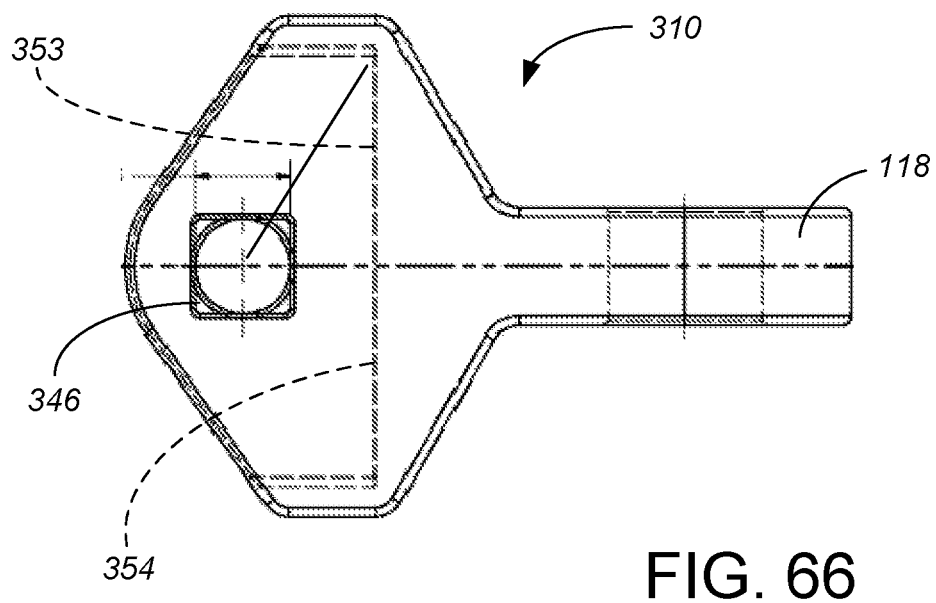
FIG. 66 is a side view of the head of FIGS. 59-61.
Figure 72:
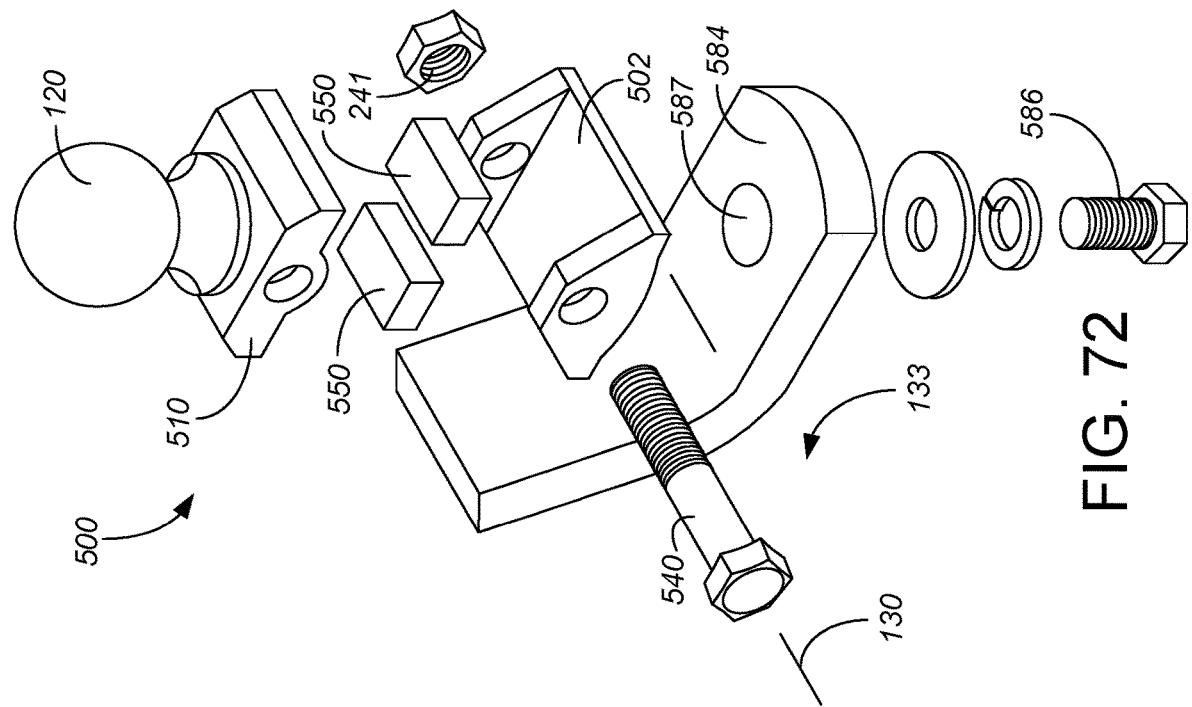
FIG. 72 is an exploded rear view of the towing hitch of FIG. 71.
Figure 71:
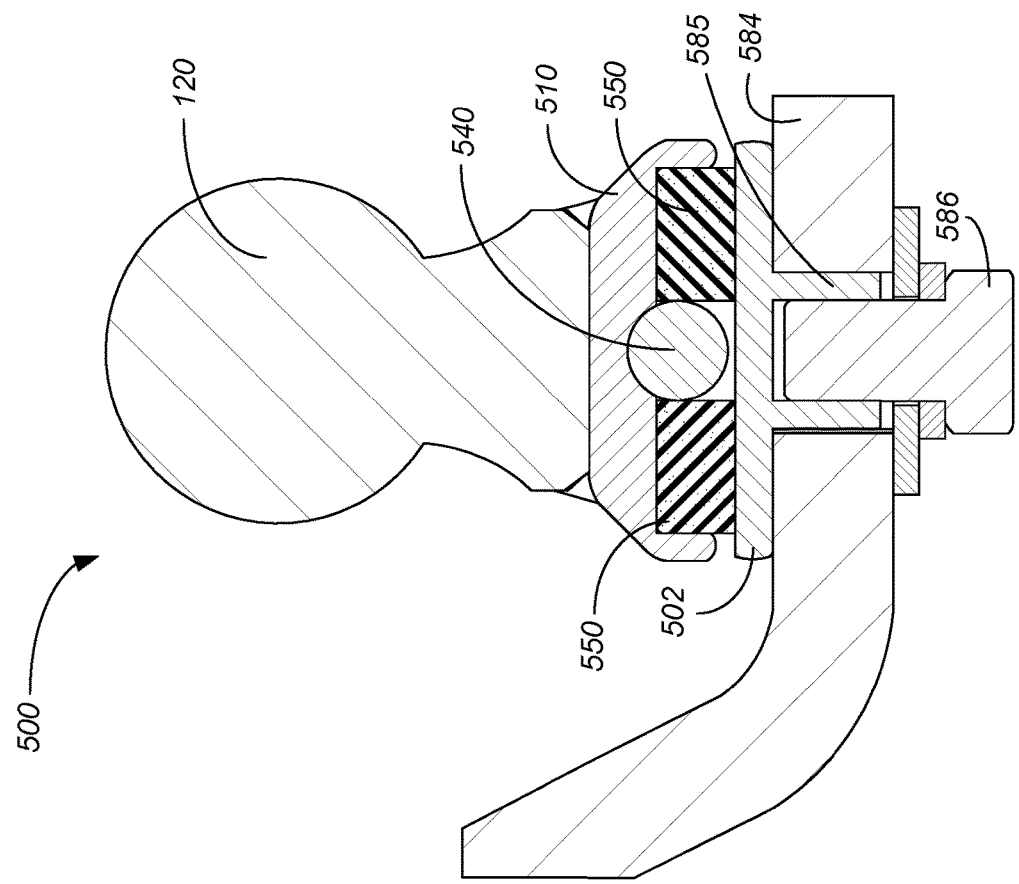
FIG. 71 is a vertical cross-sectional view of yet another alternative embodiment of a vibration minimization ball mount towing hitch of the present invention.

Other than the pad 150, 250, 350, 550, the remaining components can be formed mostly or entirely of steel, but alternatively could be formed of aluminum, other metals or alloys, or composite materials provided the material selected can withstand the stresses imparted during towing. The metal parts can be cast, machined or formed by welding components. For instance, as shown in FIGS. 59, 60 and 67, the shank 302 is formed by welding a hollow tube 361 to a cast shank plate 362.

In the geometry of the first three preferred embodiments, the pivot pin 133 is at the same elevation as the hitch pin hole 104 through the shank 102, 202, 302. This tends to align the forces imparted during acceleration and deceleration of the trailer in the longitudinal direction of the shank 102, 202, 302 within the receiver tube. In other preferred embodiments, such as those shown in FIGS. 68-74, the pivot pin axis 130 is offset from the centerline of the shank 102, so a longitudinal towing force imparts a moment about the hitch pin making the hitch 400, 500, 600 more likely to rattle within the receiver tube during use, but also giving the user more options regarding elevation of the ball 120. When using any of the embodiments of FIGS. 68-74, the user may also want to use some additional dampening structure (not shown) associated with the hitch pin to better prevent such rattling.

In all of these embodiments, the ball 120 can only compress the pad 150, 250, 350, 550 through circumferential movement of the ball 120 about the pivot pin axis 130. Forces which in the radial direction from the center of the ball 120 toward or away from the pivot pin axis 130 are transmitted through the hitch 100 substantially entirely through metal structures without any compression of the pad 150, 250, 350, 550. In the geometry of the preferred embodiments shown in FIGS. 1-70, the arced range of motion of the center of the ball 120 about the pivot axis 130 is substantially vertical, with the radial direction from the center of the ball 120 to the pivot axis 130 substantially aligning with the longitudinal direction. In these configurations, vertical forces, including vertical vibration, is dampened through compression and/or relaxation of the two (top and bottom) sides 258, 259 of the pad 50, allowing a vertical ball movement of at least ¼ inch. In the preferred embodiments of FIGS. 1-28 and 31-43, changes of up to 4000 pounds of vertical hitch tongue force (from pressing downward with 2000 pounds of force to pulling upward with 2000 pounds of force) will cause compression/relaxation of the pad 150, 250 and a substantially vertical movement of the tow ball 120 relative to the receiver tube of up to about 1½ inches.

Figure 32:
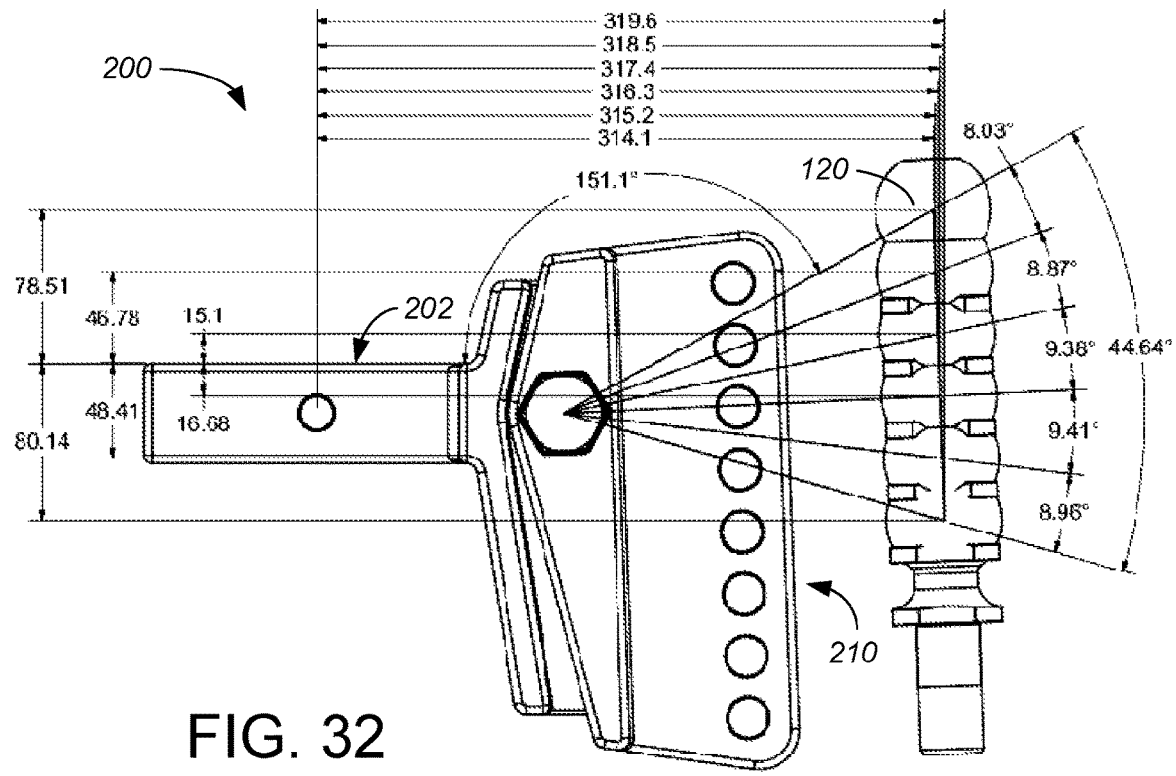
FIG. 32 is a dimensioned side view, showing the relationship between the center of the ball and the pivot axis in each of six user-selectable elevational positions, while at rest and not supporting a towing load.
Figure 33:
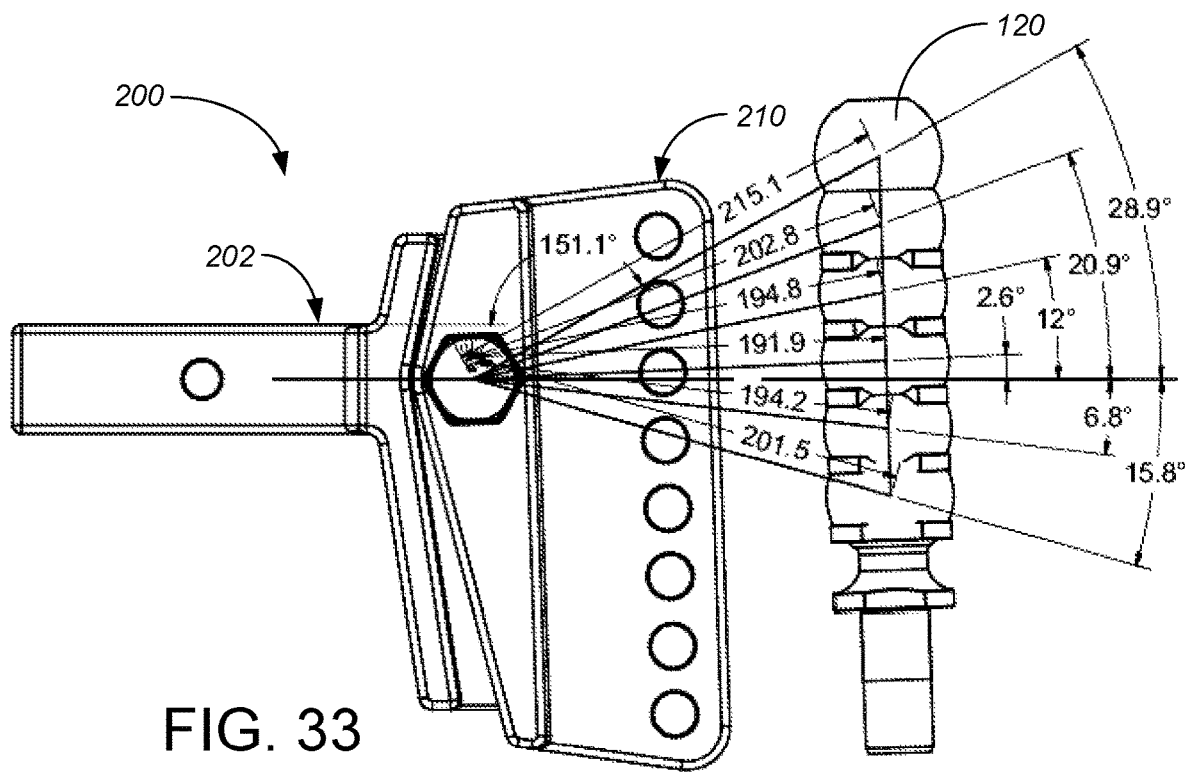
FIG. 33 is an additional dimensioned side view, showing the relationship between the center of the ball and the pivot axis in each of six user-selectable elevational positions, while at rest and not supporting a towing load.
Figure 34:
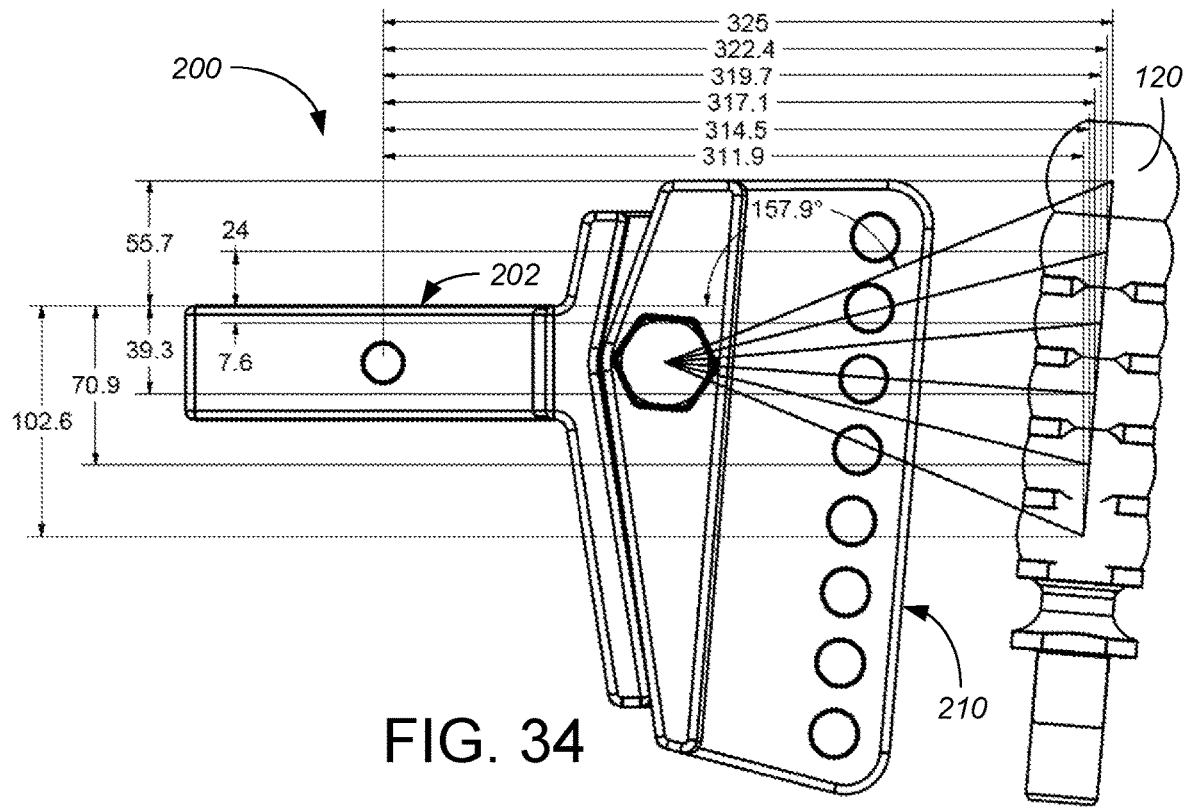
FIG. 34 is a dimensioned side view, showing the relationship between the center of the ball and the pivot axis in each of six user-selectable elevational positions, while at maximum downward deflection.
Figure 35:
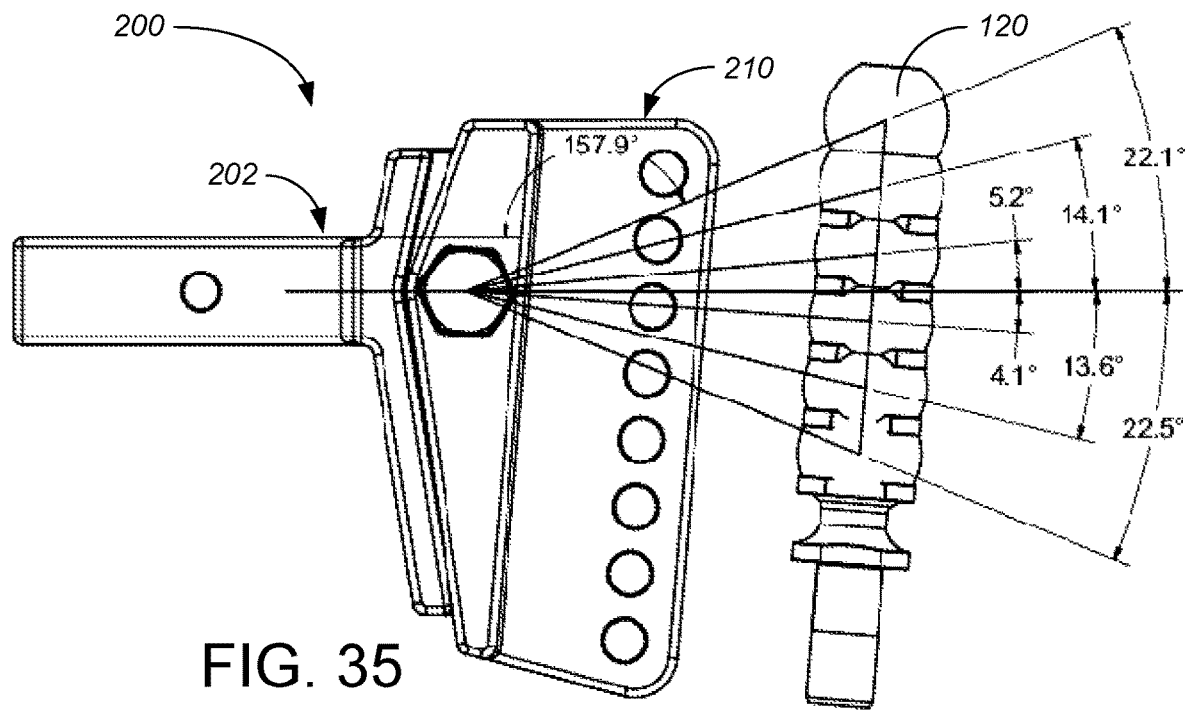
FIG. 35 is an additional dimensioned side view, showing the relationship between the center of the ball and the pivot axis in each of six user-selectable elevational positions, while at maximum downward deflection.
Figure 36:
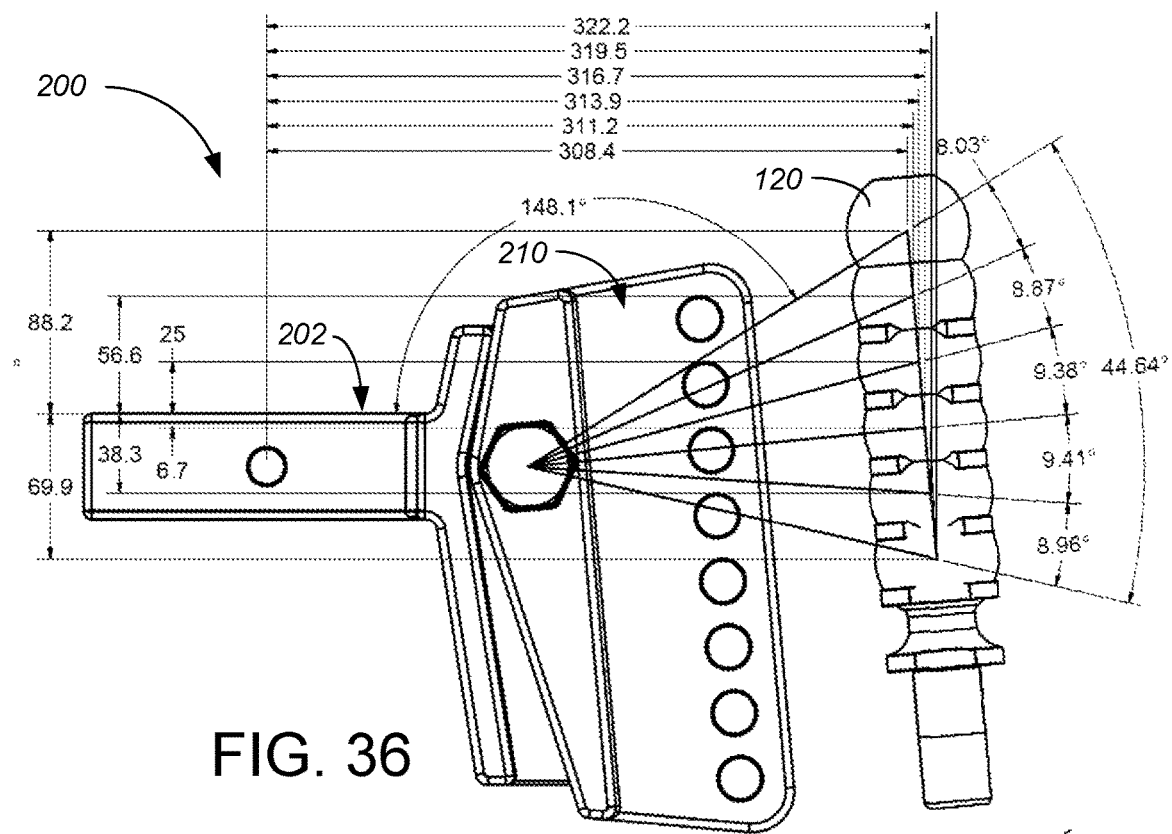
FIG. 36 is a dimensioned side view, showing the relationship between the center of the ball and the pivot axis in each of six user-selectable elevational positions, while at maximum upward deflection.
Figure 37:
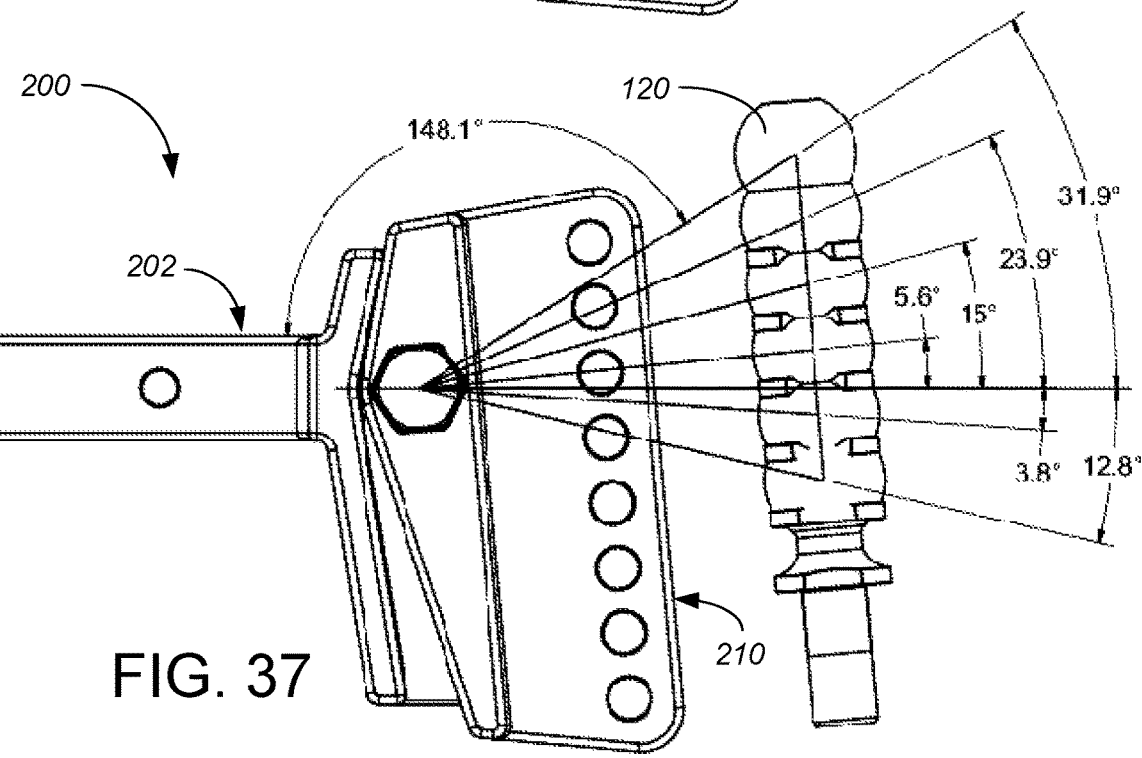
FIG. 37 is an additional dimensioned side view, showing the relationship between the center of the ball and the pivot axis in each of six user-selectable elevational positions, while at maximum upward deflection.

Particularly as called out in the angles for the highest and lowest elevations of the ball 120 on FIGS. 35 and 37 and with the positions in mm called out in FIGS. 32, 34 and 36 and tabulated below, the geometry allows some relative longitudinal movement, up to the maximum permissible horizontal movement of 16.6 mm as compared to the maximum permissible vertical movement at all ball 120 elevations of about 32.5 mm. TABLES III and V tabulate a comparison between the rest position and the maximum downward deflection and upward deflection of the ball 120, for each of the six user-selectable elevations. TABLE VI tabulates a comparison between the maximum downward deflection and upward deflection of the ball 120, for each of the six user-selectable elevations.

TABLE I

HITCH AT REST

| POSITION | HORIZONTAL | VERTICAL |
|---|---|---|
| 1 | 314.1 | 78.5 |
| 2 | 315.2 | 46.8 |
| 3 | 316.3 | 15.1 |
| 4 | 317.4 | −16.7 |
| 5 | 318.5 | −48.4 |
| 6 | 319.6 | −80.1 |
| TOTAL ADJUSTMENT | 5.5 | 158.6 |
| (TOTAL INCHES) | 0.2 | 6.2 |

TABLE II

UPWARD MAX (3°)

| POSITION | HORIZONTAL | VERTICAL |
|---|---|---|
| 1 | 308.4 | 88.2 |
| 2 | 311.2 | 56.6 |
| 3 | 313.9 | 25 |
| 4 | 316.7 | −6.7 |

TABLE II-continued

UPWARD MAX (3°)

| POSITION | HORIZONTAL | VERTICAL |
|---|---|---|
| 5 | 319.5 | −38.3 |
| 6 | 322.2 | −69.9 |
| TOTAL ADJUSTMENT | 13.8 | 158.1 |
| (TOTAL INCHES) | 0.5 | 6.2 |

TABLE III

UPWARD MAX VS AT REST

| HORIZONTAL | VERTICAL |
|---|---|
| −5.7 | 9.7 |
| −4 | 9.8 |
| −2.4 | 9.9 |
| −0.7 | 10 |
| 1 | 10.1 |
| 2.6 | 10.2 |

| TOTAL TRAVEL | 16.4 | 59.7 |
|---|---|---|
| (TOTAL INCHES) | 0.6 | 2.4 |

TABLE IV

DOWNWARD MAX (7°)

| POSITION | HORIZONTAL | VERTICAL |
|---|---|---|
| 1 | 325 | 55.7 |
| 2 | 322.4 | 24 |
| 3 | 319.7 | −7.6 |
| 4 | 317.1 | −39.3 |
| 5 | 314.5 | −70.9 |
| 6 | 311.9 | −102.6 |
| TOTAL ADJUSTMENT | 13.1 | 158.3 |
| (TOTAL INCHES) | 0.5 | 6.2 |

TABLE V

DOWNWARD MAX VS AT REST

| HORIZONTAL | VERTICAL |
|---|---|
| 10.9 | −22.8 |
| 7.2 | −22.8 |
| 3.4 | −22.7 |
| −0.3 | −22.6 |
| −4 | −22.5 |
| −7.7 | −22.5 |

| TOTAL TRAVEL | 33.5 | 135.9 |
|---|---|---|
| (TOTAL INCHES) | 1.3 | 5.4 |

TABLE VI

DOWNWARD VS UPWARD MAX

| HORIZONTAL | VERTICAL |
|---|---|
| 16.6 | −32.5 |
| 11.2 | −32.6 |
| 5.8 | −32.6 |
| 0.4 | −32.6 |
| −5 | −32.6 |

TABLE VI-continued

DOWNWARD VS UPWARD MAX

|  | HORIZONTAL | VERTICAL |
|---|---|---|
|  | −10.3 | −32.7 |
| TOTAL TRAVEL | 49.3 | 195.6 |
| (TOTAL INCHES) | 1.9 | 7.7 |

Note that the first two preferred configurations have a different pad geometry below the pivot axis 130 than above the pivot axis 130. In general, the pad 150, 250, 350 below the pivot axis 130 is compressed due to downward forces on the tow ball 120, whereas the pad 150, 250, 350 above the pivot axis 130 is compressed due to upward forces on the tow ball 120. Compression of the pad 150, 250, 350 above the pivot axis 130 particularly occurs in weight distribution hitches. While the current designs use a single pad 150, 250, 350 with different geometry above the pivot axis 130 than below the pivot axis 130, the invention could alternatively use two separate pads, one above the pivot axis 130 and one below the pivot axis 130. The two separate pads could have different durometers to further customize resistance in either direction. During use of a single pad 150, 250, 350, the bottom 159, 259 and top 158, 258 use undergo significantly more compression than the middle of the pad, which undergoes almost no compression. If desired, for embodiments with two separate pads 550, the pads 550 can be spaced so the compressive load across each pad 550 is more consistent.

Note also that the preferred configurations allow more downward movement from the rest position than upward movement from the rest position, such as a target downward deflection of about 7° versus a target upward deflection of about 3°. This is to account for the fact that most trailers place a downward tongue weight on the tow ball 120. Due to tongue weight, for most vibrations, the vibration absorption will occur entirely through compression of the bottom side 159, 259 of the pad 150, 250, 350 with little or no compression of the top side 158, 159 of the pad 50.

In the embodiments of FIGS. 31-37 and 59-61, the pad 250, 350 interacts in a single cavity between two parallel generally vertical walls. The resultant motion places some shear on the pad 50 in addition to compression. In other embodiments, particularly when two pads 550 are used such as the embodiments of FIGS. 71-73, the pad(s) 550 can be loaded to counteract the movement of the tow ball 120 almost entirely in compression.

Provided the metal structure and pivot pin 133 are designed to be sufficiently strong, the identical metal structure can be sold with any of several available different durometer or different material pads, for use in towing loads. For instance, the metal structures shown may be sold as a Class III hitch bar (maximum gross trailer weight of 6000 lbs. with a maximum trailer tongue weight (TW) of 600 lbs.) with a first, relatively compressible pad installed in the pocket, sold as a Class IV hitch bar (maximum gross trailer weight of 10,000 lbs. with a maximum trailer tongue weight (TW) of 1000 lbs.) with a second, less compressible pad installed in the pocket, or sold as a Class V hitch bar (maximum gross trailer weight of 12000 lbs. with a maximum trailer tongue weight (TW) of 1200 lbs.) with a third, even stiffer pad installed in the pocket. A single metal structure can also be sold with several different durometer or different material pads as a kit, allowing the user to tow different loads while changing to the appropriate pad for the load being towed at that particular time.

Other than the lower three positions of the first and second embodiments, the remaining positions/embodiments all have the center of the tow ball 120 at an elevation higher than the pivot axis 130. These preferred elevations of the ball 120 relative to the pivot axis 130 tend to put the primary load path more through the shank 102, 202, 302, 402, 502, 602 versus cantilevered. Additionally, in the lower two positions, the pad 150, 250 takes more of a preset in the loaded condition and therefore has a smaller range of travel/articulation during normal use. The elevations of the six ball positions are skewed upward to partially compensate from these effects.

If desired for the best force transmission profile, the pad 150, 250, 350, 550 can be pre-compressed (i.e., away from and outside the shank and the head) as a manufacturing step prior to assembly of the vibration minimization towing hitch 100, 200, 300, 400, 500, 600, thereby changing the elastic set point of the pad material. As an additional or separate option and as desired for the best force transmission profile, the pad 150, 250, 350, 550 can be additionally compressed during assembly of the vibration minimization towing hitch 100, 200, 300, 400, 500, 600, (i.e., due to the pad 150, 250, 350, 550 having uncompressed dimensions greater than the size of the pocket in which the pad 150, 250, 350, 550 is placed). In the most preferred embodiment, the pad 150 is tuned for the geometry of the vibration minimization towing hitch portions to provide the desired vertical vibration dampening while minimizing any horizontal dampening.

For the first four embodiments, the geometry of the pivoting relationship of the ball 120 relative to the positioning of the pocket determines the amount of compressive force of the pad 150, 250, 350 relative to the hitch tongue weight supported. In the first three embodiments, the pocket which receives the pad 150, 250, 350 is between the pivot pin 133 and the ball 120. Such arrangements place a higher compressive force on the pad 150, 250, 350 than the force supported by the hitch tongue 118. The pivot pin could alternatively be between the ball and the pad. By placing the pad on the other side of the pivot pin, the pivot pin is positioned closer to the ball, providing a shorter moment arm for pivoting of the ball (and less mechanical advantage for compressing the pad) as compared to the depicted embodiments.

TABLE VII below shows the measured pivoting relationship of the ball 120 versus hitch tongue weight for the second embodiment of FIGS. 31-37, using the hitch tongue 118 in the lowest position, during the initial loading of the pad 250.

TABLE VII

| FORCE (lb) | DEFLECTION (mm) |
|---|---|
| 0 | 0 |
| 1000 | −1.13 |
| 1500 | −2.09 |
| 2000 | −2.98 |
| 2500 | −3.56 |
| 3000 | −4.01 |
| 3500 | −4.35 |
| 4000 | −4.65 |
| 4500 | −4.99 |
| 5000 | −5.52 |
| 0 | −1.15 |

The preferred embodiments require at least 200 pounds of tongue weight for each degree of rotation about the pivot pin 133, and more preferable 800-1200 pounds of tongue weight for each degree of rotation about the pivot pin 133. As can be seen in TABLE VII, loading 5000 pounds of tongue weight onto the pad 250 caused about 1° of plastic deformation of the lower side 258 of the pad 250, i.e., when the 5000 pounds of tongue weight was removed, instead of bouncing all the way back to its original position, the embodiment of FIGS. 31-37 left the tongue 118 hanging 1° lower than before this initial loading. If desired, the geometry can be adjusted such that the tongue 118 slopes slightly upward prior to its initial loading, expecting a tongue weight loading that will cause plastic deformation and bring the tongue 118 closer to a horizontal position, either during towing while the expected tongue weight is being applied or after towing when the pad 250 does not fully bounce back to its initial size.

Because in the geometries depicted in FIGS. 1-70 the pad 150, 250, 350 dampens vertical vibrations significantly more than it dampens horizontal vibrations, and because the vertical vibration dampening occurs mostly through compressive stress on and not torsion of the pad 150, 250, 350, wear characteristics of the pad 150, 250, 350 are much better than prior art vibration dampening structures. In the geometries depicted in FIGS. 1-70, horizontal (particularly longitudinally-directed) towing forces are transmitted largely by metal structures with minimal pad compression, providing a more accurate, less yielding feel to the hitch 100, 200, 300, 400 when accelerating and decelerating the towing vehicle. However, because the majority of the objectionable vibration forces sensed (and/or heard) by the towing vehicle driver are in the vertical plane, the vibration minimization towing hitch 100, 200, 300, 400 creates a much better ride experience.

For the last two embodiments, the geometry of the pivoting relationship of the ball 120 relative to the positioning of the pocket determines the amount of compressive force of the pads 550 not relative to the hitch tongue weight supported, but rather relative to the tow force (acceleration or deceleration) being transmitted through the hitch 500, 600. During acceleration, the ball 120 tilts rearward. During deceleration, the ball 120 tilts forward. The majority of the objectionable vibration forces sensed (and/or heard) by the towing vehicle driver are still transmitted vertically from the head 510, 610 through the pivot pin 133, 647 to the shank 502, 602. However, the hitches 500, 600 are still an improvement on the prior art, particularly eliminating vibration and rattling when the driver accelerates or decelerates in a jerky fashion.

Figure 38:
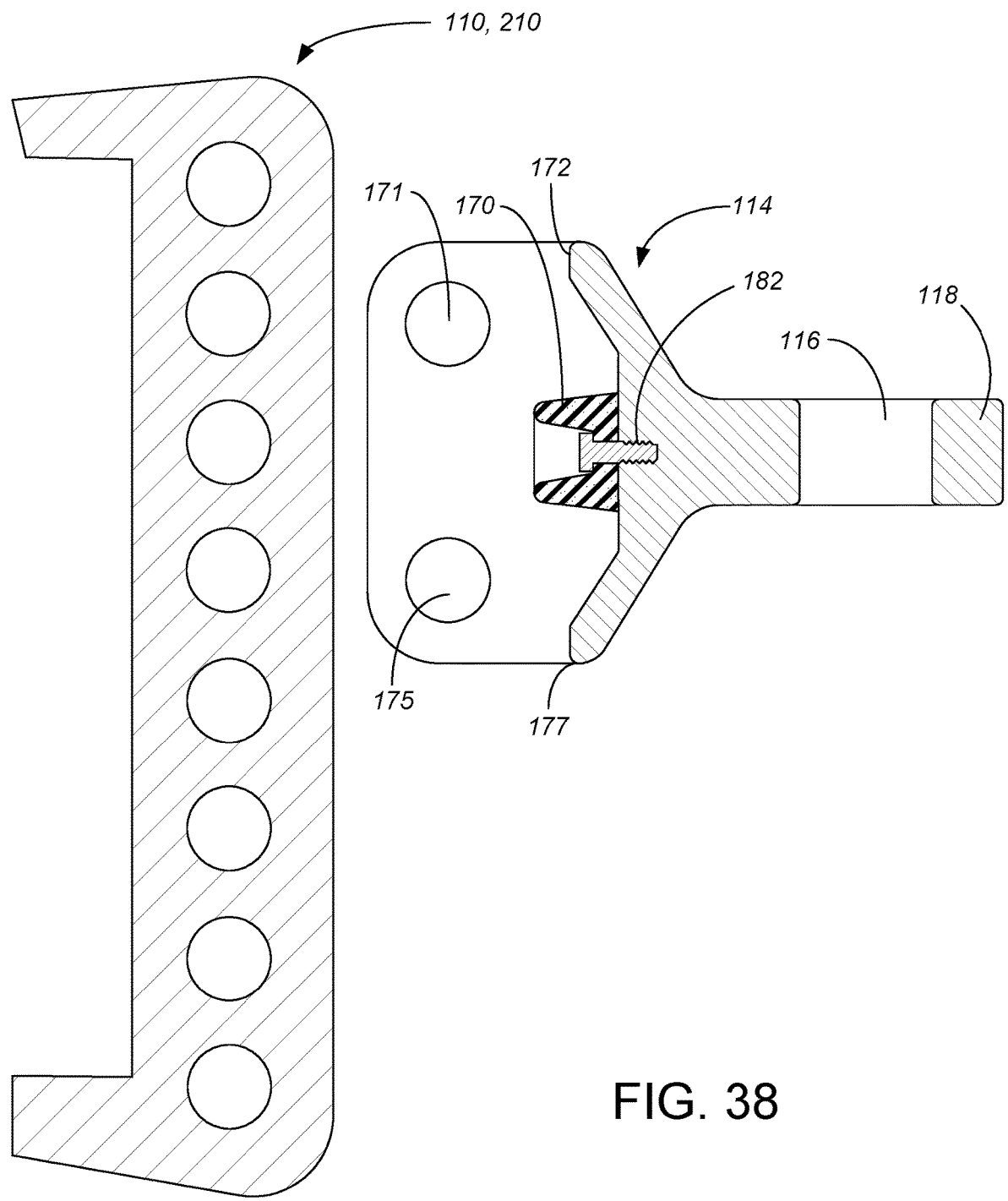
FIGS. 38-43 illustrate show the assembly process, performed by the user, to attach the tongue assembly to the shank/head, all taken as cross-sectional views along the longitudinal center plane of the hitch structure, and not showing the proximal portion of the shank/head and not showing the ball or trailer (hitching structure which is significantly downstream of the present invention).
Figure 39:
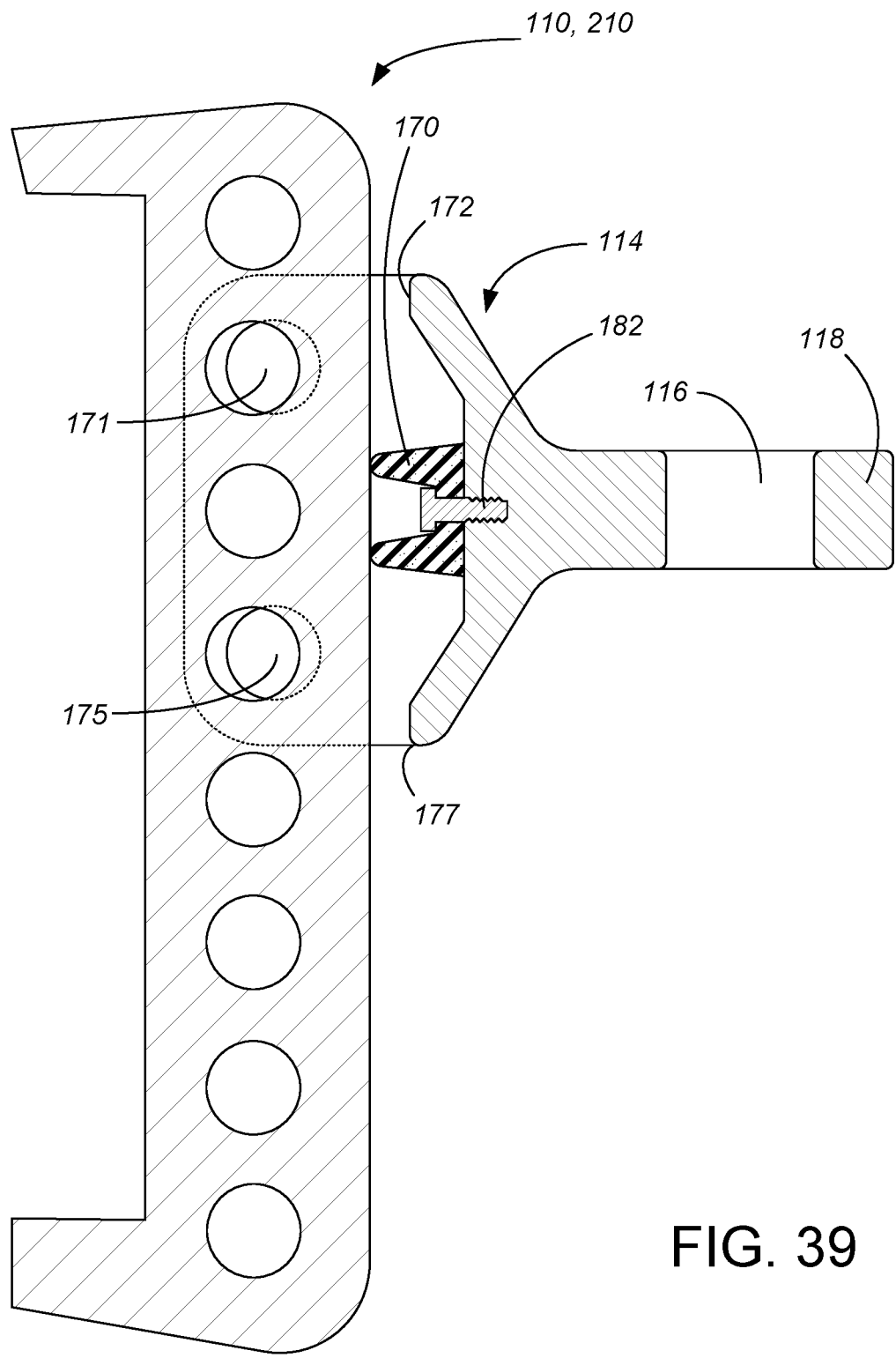
Figure 40:
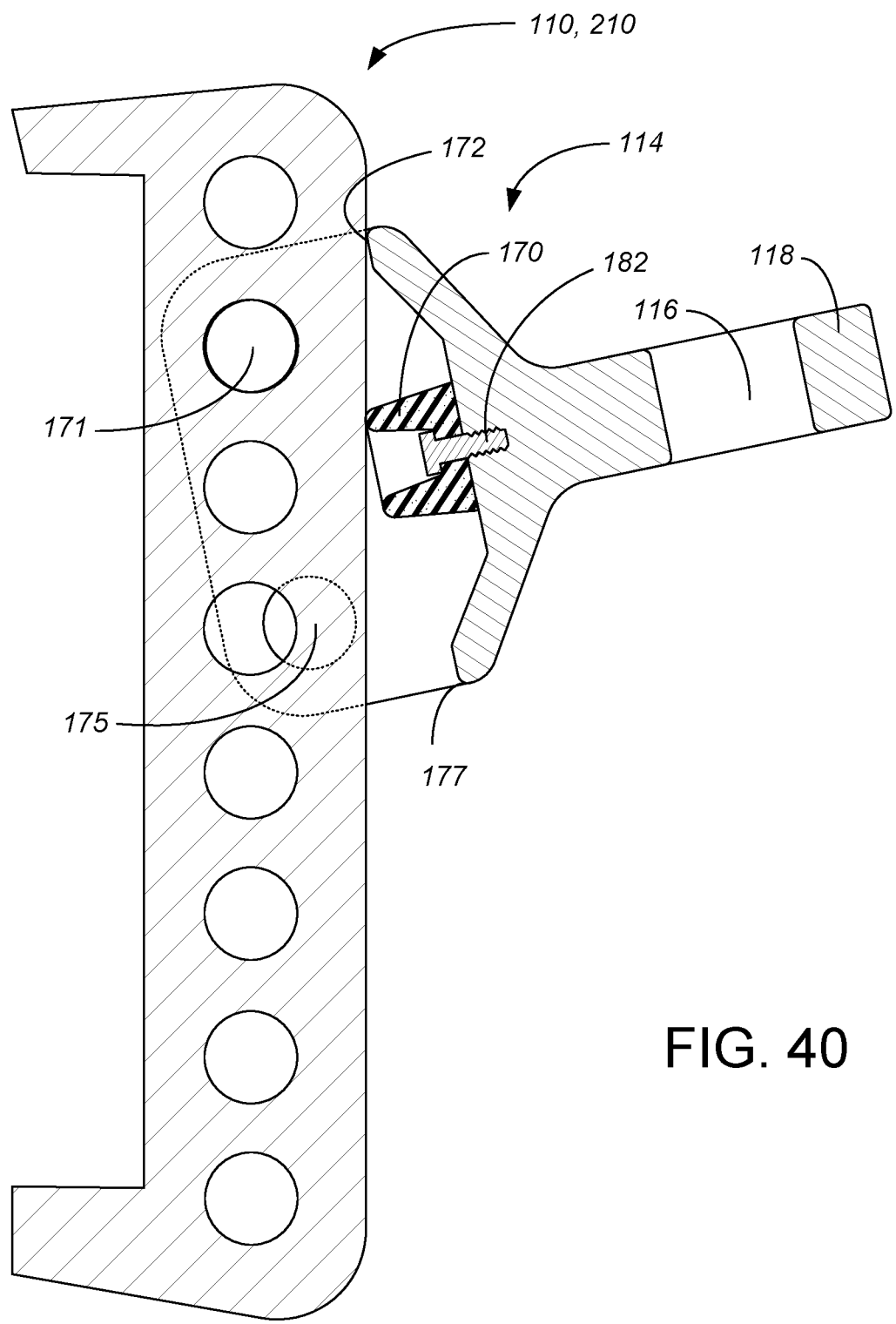

The hitches 100, 200 of the first two embodiments of FIGS. 1-37 also use a second a significantly compressible member, referred to as a bumper 170, in order to further minimize rattle in conjunction with a two pin/bolt assembly. In the location used, the bumpers 170 of the present invention minimize rattle both in loaded and unloaded situations. FIGS. 38-43 show the two pin/bolt assembly process, performed by the user, to attach the tongue assembly 114 to the shank/head assembly, all taken as cross-sectional views along the longitudinal center plane of the hitch structure, and not showing the proximal portion of the head 110 and not showing the ball 120 or trailer. As shown in FIG. 38, the user has decided to attach the tongue assembly 114 in the second-to-highest position in elevation. As shown in FIG. 39, when the user positions the tongue assembly 114 onto the head 110, the bumper 170 interferes with the head 110 and will not permit the respective pin holes 112 from the head 110 and the pin holes 171, 175 from the tongue assembly 114 to line up without compression of the bumper 170. To achieve assembly, the user first tilts the tongue assembly 114 (preferably upward), until one (preferably the top) of the sets of pin holes 171, 112 are in alignment as shown in FIG. 40. Preferably this places the tongue assembly 114 so contact is made at two locations, between the metal face of the head 110 assembly and both an edge of the bumper 170 and another metal surface 172 of the tongue assembly 114.

Figure 41:
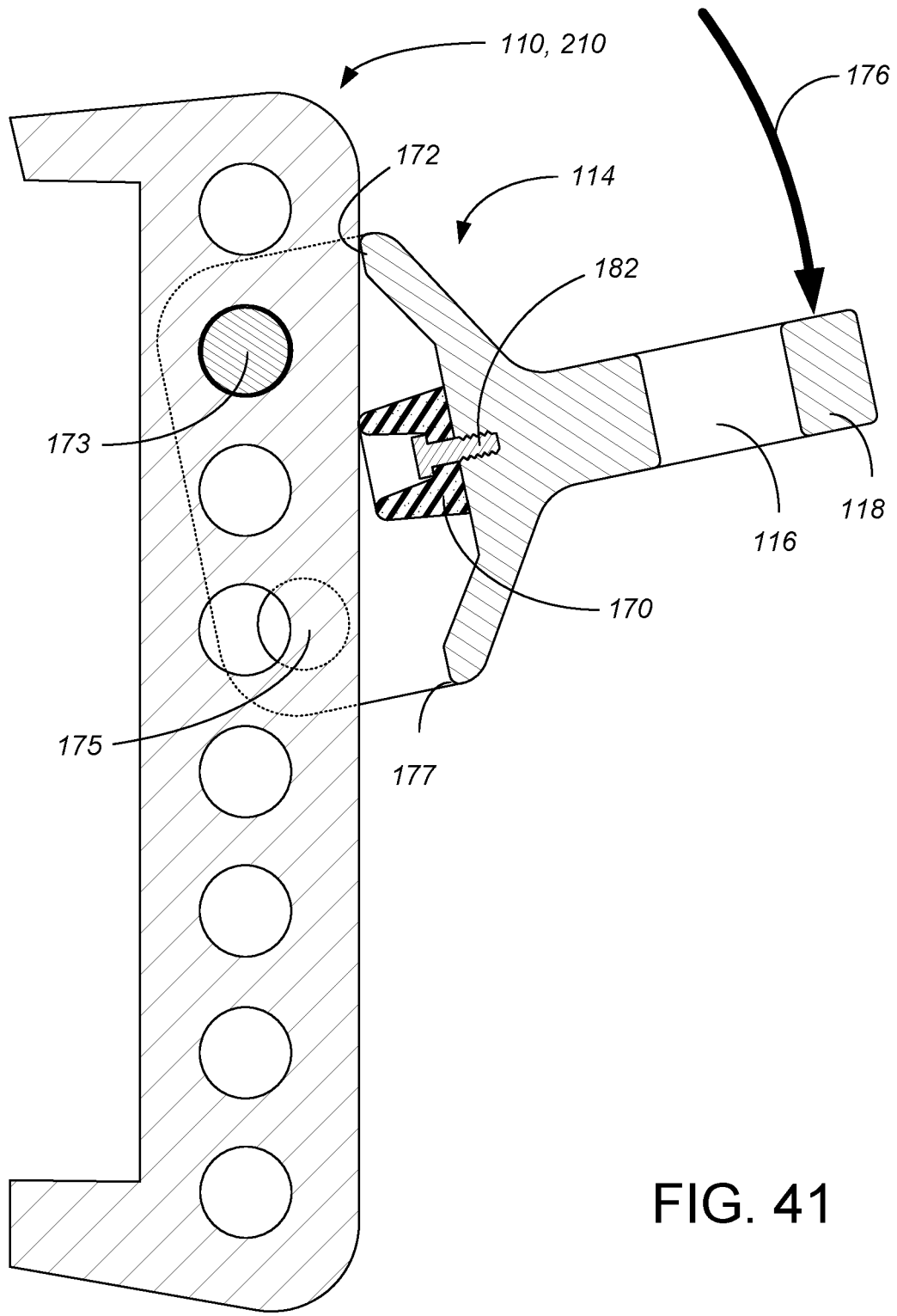
Figure 42:
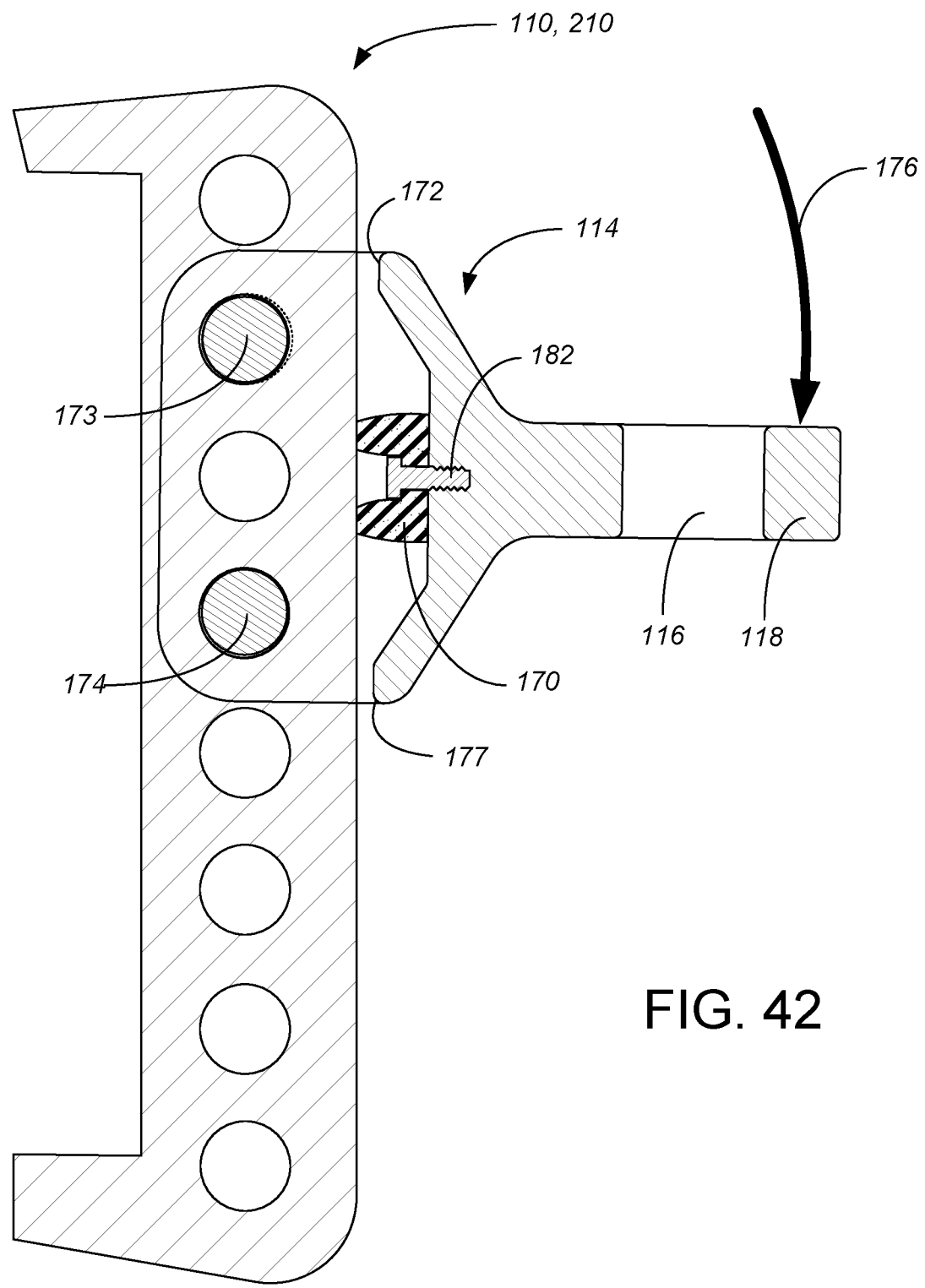

The pin holes 112, 171 have enough clearance relative to the pin 173 to allow insertion of the pin 173. For instance, in the preferred embodiment using pins 173, 174 with a nominal 19 mm outer diameter, the pin holes 112 in the head 110 and the pin holes 171, 175 in the tongue assembly 114 are designed at 20 mm±0.5 mm. This results in 1 mm of nominal tolerance, that can vary in any given unit from about 0.5 mm to 1.5 mm, in all cases leaving enough clearance that, so long as the holes 112, 171 in the head 110 and tongue assembly 114 are close to being aligned, the user can insert the (upper) pin 173 through the aligned holes as shown in FIG. 41.

One the first pin 173 is fully inserted, the user can then crank downward on the end of the tongue 118 and shown by arrow 176, rotating the tongue assembly 114 relative to the (upper) pin 173 and significantly compressing the bumper 170. The compression force of the bumper 170 will cause the (upper) pin hole 171 of the tongue assembly 114 to pull slightly past the corresponding pin hole 112 of the head 110 (shown by the dashed line in FIG. 41), with the (upper) pin 173 pressed firmly against one side of the tongue hole 171 and firmly against the other side of the head hole 112, taking up all the clearance between the pin 173 and its pin holes 112, 171. By cranking the tongue 118 downward slightly past horizontal (shown at 0.8° past horizontal in FIG. 42), the other (bottom) sets of pin holes 175, 112 line up. While maintaining the downward force on the end of the tongue 118, the user can then insert the other (bottom) pin 174.

The amount of downward force on the end of the tongue 118 to align the pin holes 175, 112 depends upon the shape, size, amount of rubber displaced, lever arm (of the mount 118), location, and durometer of the bumper 170, but should be a force that typical users can readily provide, such as a force between 1 and 75 pounds on the end of the tongue 118. In the preferred geometry shown, the bumper 170 has a moment arm relative to either pin hole 171, 175 which is about one half to one fourth of the length of the moment arm for the force on the end of the tongue 118, so the compressive force of the bumper 170 is about two to four times as great as the force the user must supply on the end of the tongue 118 to align the pin holes 175, 112, i.e., the preferred compressive force of the bumper 170 is between about 2 and 300 pounds. In the most preferred embodiment shown, the lever arm from the end of the tongue 118 to the upper pin hole 171 is about 5⅓ inches, while the moment arm from the center of the bumper 170 up to the upper pin hole 171 is about 1¼ inches, i.e., the geometry provides a mechanical advantage of just over 4:1 in applying the force resulting in sufficient compression of the bumper 170 to allow insertion of the other (bottom) pin 174.

Figure 43:
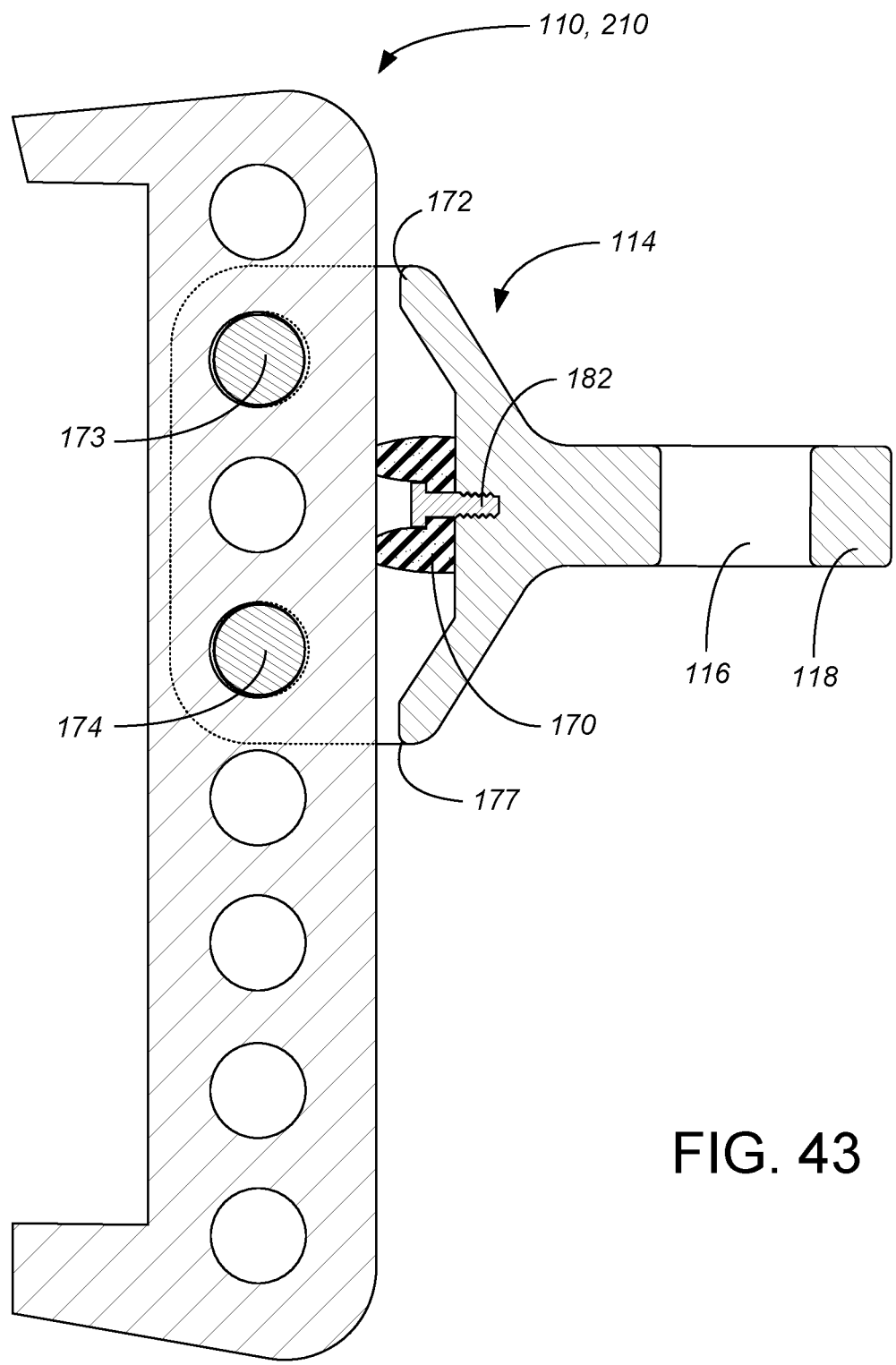
Figure 44:
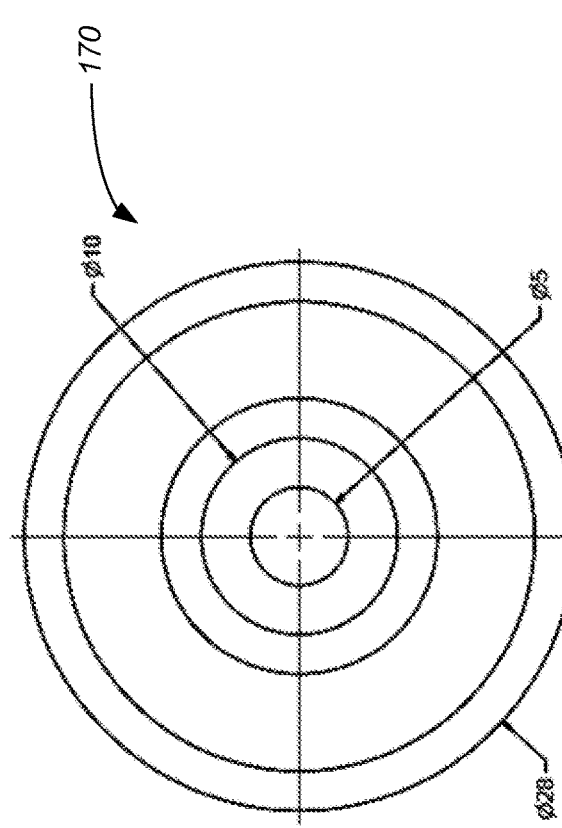
FIGS. 44-46 are end, side and cross-sectional views of the preferred bumper used in the tongue assembly of FIGS. 21 and 38-43.
Figure 46:
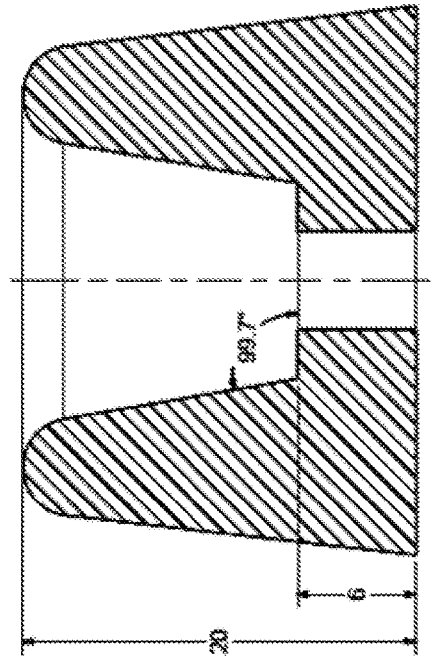
Figure 45:
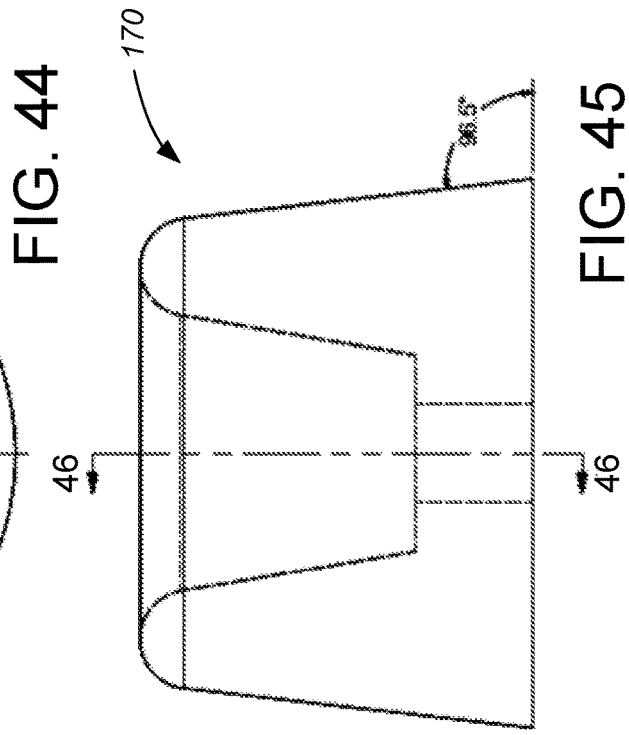
Figure 47:
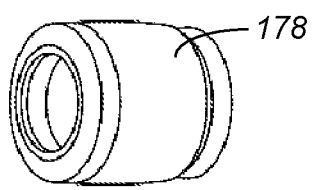
FIGS. 47-58 are perspective, end and side views of four additional different bumper embodiments for use in the present invention.
Figure 48:
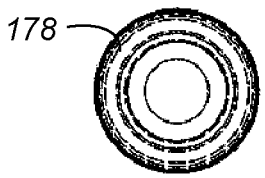
Figure 49:
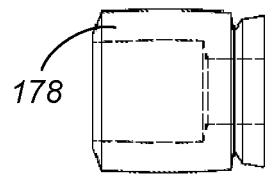
Figure 50:
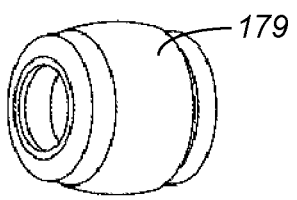
Figure 51:
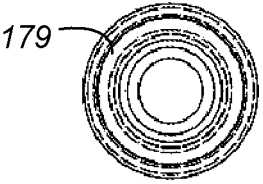
Figure 52:
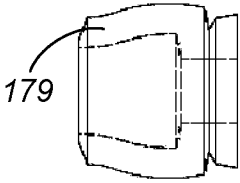
Figure 53:
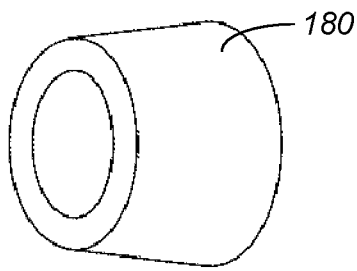
Figure 54:
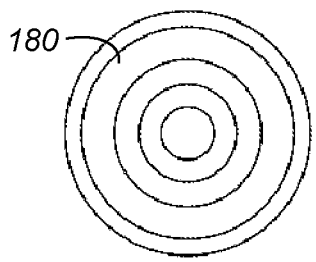
Figure 55:
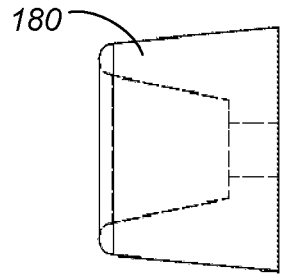
Figure 56:
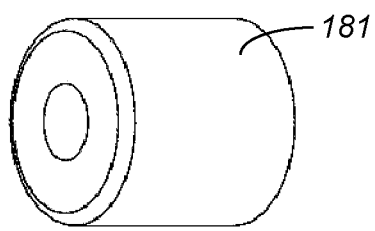
Figure 57:
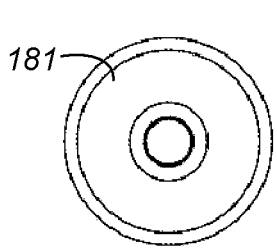
Figure 58:
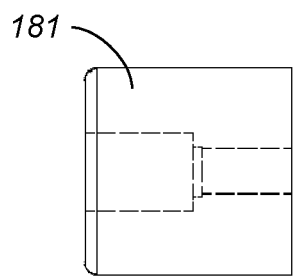

Once releasing the downward force on the end of the tongue 118, the compressive force of the bumper 170 causes the end of the tongue 118 to spring slightly higher to a generally horizontal position shown in FIG. 43. At this point, the compressive force of the bumper 170 takes up the clearance of the pins 173, 174 in both sets of holes 112, 171, 175 as shown in FIG. 43.

The amount of steady state force that the bumper 170 provides to take up the clearance between the pins 173, 174 and their respective holes 112, 171, 175 depends upon the material and geometry of the bumper 170 as well as the geometry between the head 110 and the tongue assembly 114. The bumper 170 should be made of a material significantly softer than the metal of the head 110 and the metal of the tongue 118. Alternatively, the bumper could be provided by a metal spring (not shown), or other structure which uses bending to counteract a compression force. In the preferred embodiment, the bumper 170 is formed of a rubber or polyurethane material. Preferably the compressible material of the bumper 170 has a durometer in the range of 30 A to 55D (90-100 A), with the most preferred material being an 80 A durometer polyurethane. In the most preferred geometry shown in the drawings, the end of the bumper 170 is nominally compressed 3.4 mm while the pins 173, 174 are inserted into their respective holes 112, 171, 175. With the most preferred shape and durometer of the bumper 170, a force of about 80 pounds is required to compress the bumper 170 about 3.4 mm. With the most preferred tongue geometry shown, this means the user must push down on the end of the tongue 118 with a force of about 20 pounds to sufficiently compress the bumper 170 to insert the second pin 175.

The bumper 170 of the present invention is particularly good at preventing rattle in an unloaded situation, when there is no weight or little weight being placed on the end of the tongue 118. In a towing situation, whenever the tongue weight downward force is substantially equal to the force the user had to place on the end of the tongue 118 to insert the second bolt, rattle might occur in the lower bolt hole 112 and/or 175. Preferably the bumper 170 is designed and selected for towing with a different tongue weight. For instance, if the user is required to press downward on the tongue 118 with a force of 20 pounds to insert the lower pin 175, then that configuration should not be used with a trailer having a tongue weight of around 20 pounds. By keeping the trailer tongue weight significantly different from the required assembly force, rattling during towing loaded situations is also minimized.

Figure 23:
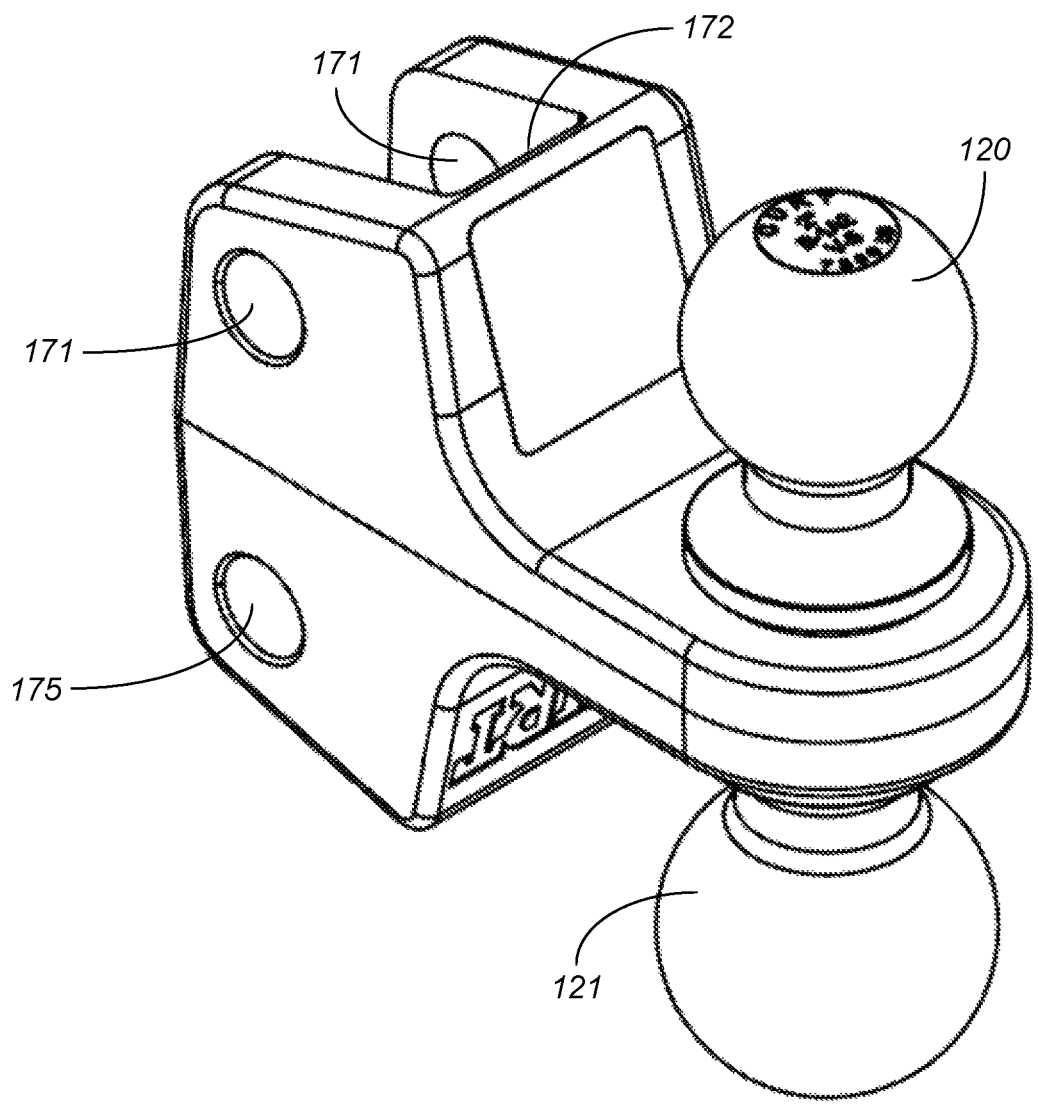
FIG. 23 is a rear perspective view of the tongue assembly of FIGS. 1-8, 21 and 22 shown supporting a dual ball member.

In the embodiment shown in FIGS. 21, 22 and 38-43, a nominal clearance of 4.6 mm exists between the top and bottom metal edges 172, 177 of the tongue assembly 114 and the face of the head 110. This clearance is what enables either the top or the bottom sets of bolt holes 171, 175 to be used for insertion of the first pin. In alternative embodiments, a smaller clearance can be provided between the bottom metal edge 177 of the tongue assembly 114 and the face of the head 110, prompting the user to only attempt assembly by pressing downward (and NOT pulling upward) on the end of the tongue 118. However, with the preferred embodiment, the tongue assembly 114 is entirely symmetrical about a horizontal bisecting plane, and thus the tongue assembly 114 can be equally used right side up or flipped over upside down (i.e., the tongue assembly 114 has no "top side" and no "bottom side" until assembled). This is particularly beneficial when using a dual tow ball 121 with two different sizes such as shown in FIG. 23.

FIGS. 47-58 detail four other preferred geometries of the bumper 178, 179, 180, 181 that can be used with the present invention. There are many ways in which the bumper 170, 178, 179, 180, 181 can be attached, including using a threaded stud, a press fit attachment, a magnetic attachment, an adhesive attachment, or a screw/fastener attachment 182.

Figure 29:
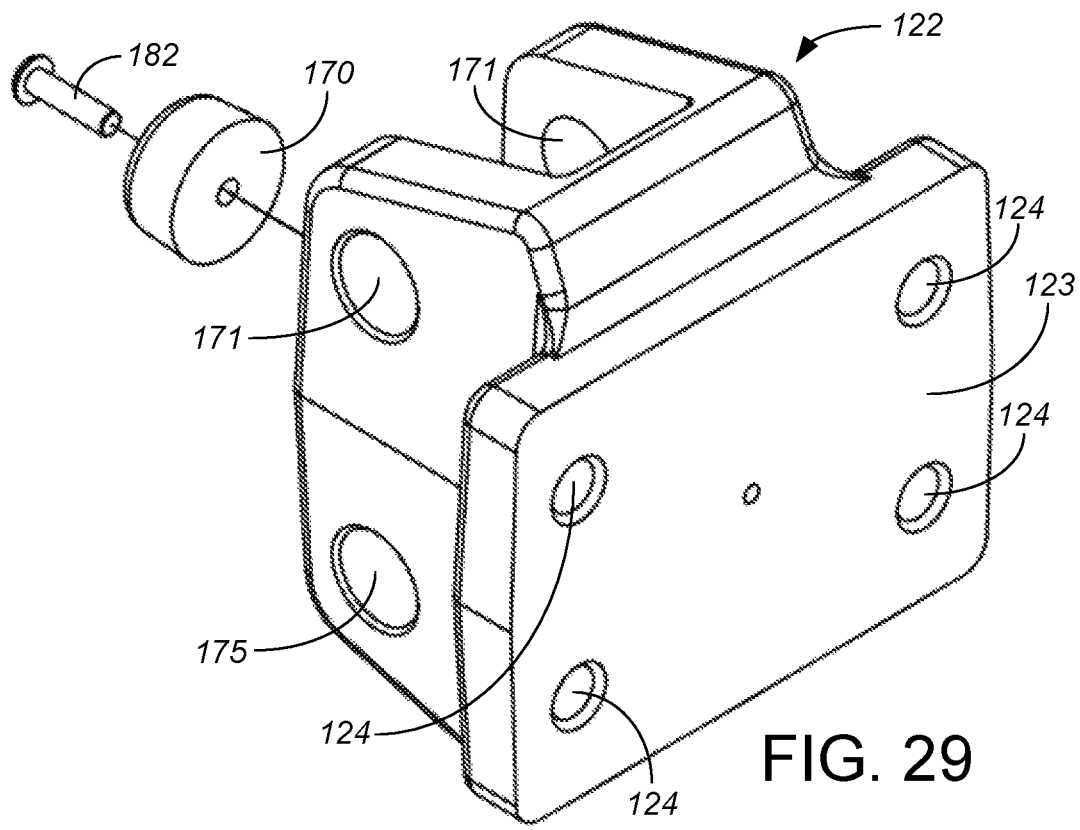
FIG. 29 is an exploded rear perspective view of an alternative pintle assembly for use with the shank/head assembly of FIGS. 1-9, illustrating the manufacturer assembling of the pintle assembly.
Figure 30:
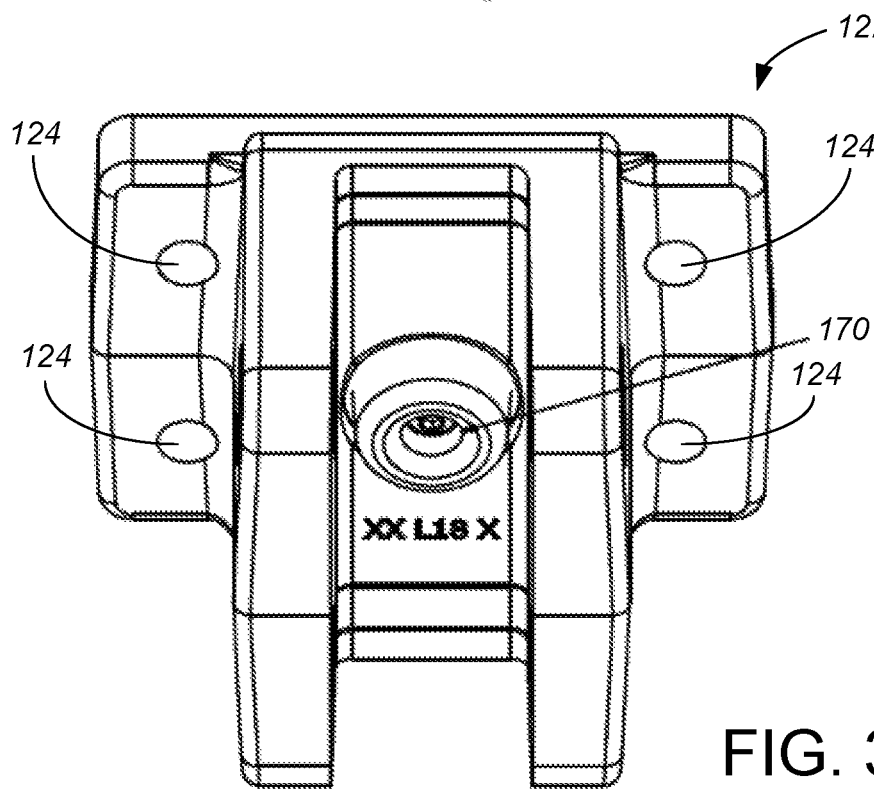
FIG. 30 is an angled downward front view of the assembled pintle assembly of FIG. 29.
Figure 31:
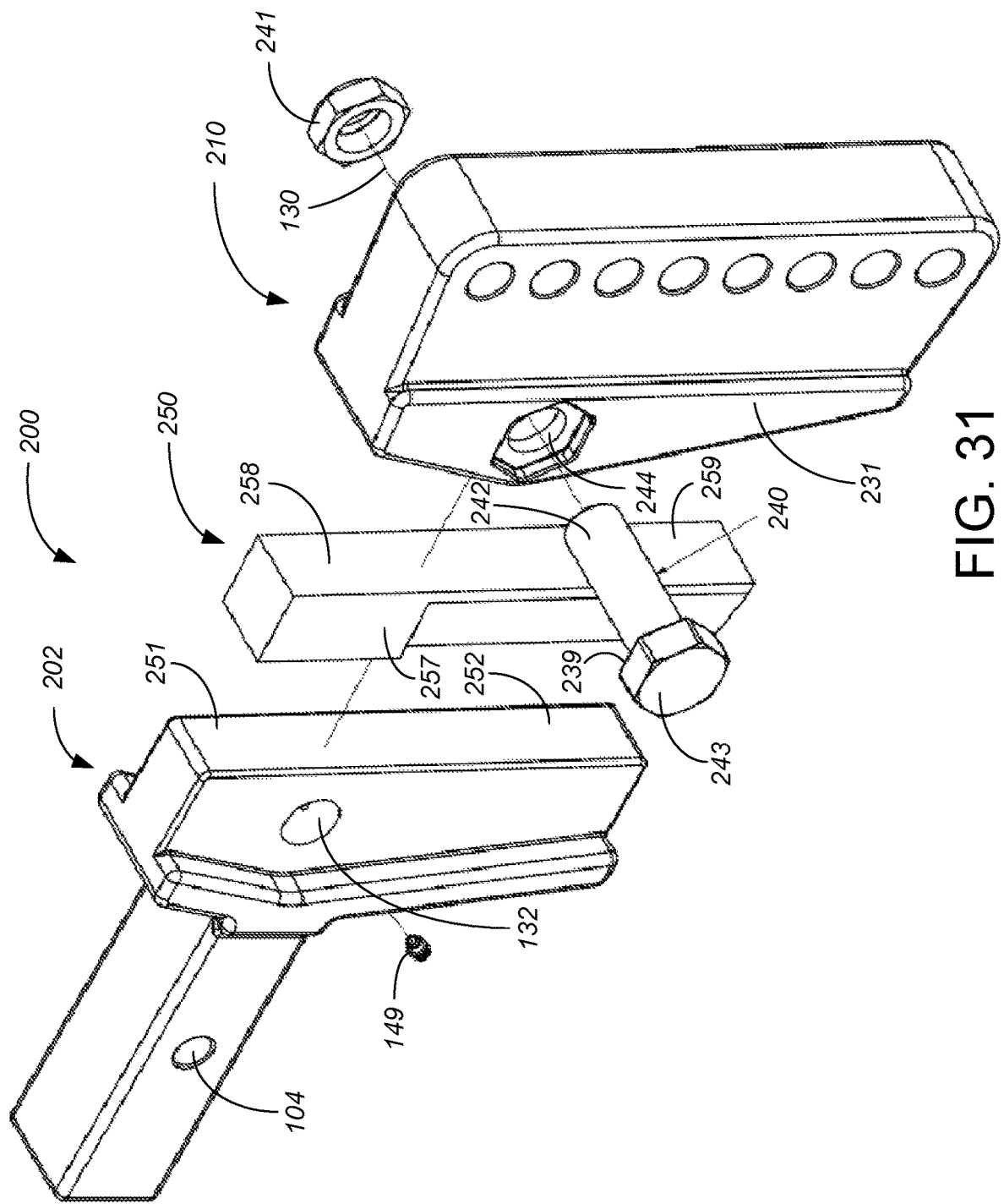
FIG. 31 is an exploded rear perspective view of an alternative shank/head assembly.

FIGS. 29 and 30 show an alternative pintle mount 122 which can be used with the preferred bumper 170 by again including a threaded hole 183 for attachment of the bumper 170 using a threaded bolt or screw 182. The pintle mount 122 provides a flat vertical receiving surface 123 with four spaced threaded bolt holes 124 for attachment of a pintle or similar head (not shown). In this case, the pintle mount 122 does not provide a tongue, and thus the 4:1 mechanical advantage described above for compressing the bumper 170 is significantly lessened. Assuming the same geometry of bumper 170 is used as described above, to create the 80 lb. compression force on the bumper 170 required for insertion of the second (lower) pin 174, the user can press down on the pintle mount 122 with a force of about 40 lbs. Alternatively, a greater mechanical advantage can be obtained by first attaching the pintle head to the pintle mount 122 before inserting the second pin 174 to attach the pintle mount 122 to the shank/head 102/110.

Note that when the bumper 170 is used in conjunction with the insert 150, 250 of either of the first two embodiments, during use there are two separate compressible rubber pieces that can absorb vibration, i.e., that the insert 150, 250 can absorb vibration in addition to the bumper 170 absorbing vibration. During use, vibration that would with the prior art be transmitted between the towed load and the towing vehicle can be absorbed by either or both of the rubber insert 150, 250 and the bumper 170, particularly in situations where clearance exists between the two attachment pins 173, 174 and their holes 171, 175.

FIGS. 71-74 show two embodiments which combine features of the earlier embodiments in a simple, retrofit solution for many types of existing ball mounts. In these embodiments, the ball 120 is attached for pivoting on a single horizontal pivot axis 130, with the mount for the pivot pin 133 being directly attachable relative to an existing tongue structure 584. Two compressible, resilient pads 550 can be used, preferably formed of a similar compressible material to the embodiments described above. The compressibility of these pads 550 allows the ball 120 to tilt or shift forward or rearward to absorb vibration between the towed load and towing vehicle. In the hitch 500 shown in FIGS. 71 and 72, the shank 502 includes an internally threaded cylindrical base 585, and an attachment bolt 586 attaches the shank 502 into the existing ball mount hole 587 of the existing tongue 584. In the hitch 600 shown in FIGS. 73 and 74, the shank 602 includes a downwardly projecting, externally threaded stud 688, attached into the existing ball mount hole 587 of the existing tongue 584 with a nut 689.

Although the present invention has been described with reference to preferred embodiments, workers skilled in the art will recognize that changes may be made in form and detail without departing from the spirit and scope of the invention.

The invention claimed is:

1. A towing hitch to transmit a towing force between a towing vehicle and a towed load, the towing hitch comprising:
   a shank formed of metal for attachment to a receiver on the towing vehicle, the shank defining a pivot axis, the shank providing a first biasing surface and a second biasing surface;
   a head formed of metal separate from the shank which is attachable to the shank for limited pivoting in either a clockwise direction or a counterclockwise direction about the pivot axis during towing, the head providing a third biasing surface and a fourth biasing surface;
   one or more compressible inserts, formed of a material substantially more compressible than the metals of the shank and the head, disposed between the shank and the head, such that pivoting of the head relative to the shank in the clockwise direction compresses the one or more compressible inserts between the first biasing surface and the third biasing surface, and such that pivoting of the head relative to the shank in the counterclockwise direction compresses the one or more compressible inserts between the second biasing surface and the fourth biasing surface; and a tow ball supported by the head, wherein a force on the tow ball in the range of 1000 to 5000 pounds, oriented to maximize pivoting of the head relative to the shank, causes a pivoting within the range of 1 to 5 degrees.

2. The towing hitch of claim 1, wherein the head comprises a tongue member mounted on a head member at any of a plurality of positions, with the tow ball mounted on the tongue member of the head.

3. The towing hitch of claim 1, wherein the first, second, third and fourth biasing surfaces each extend generally radially relative to the pivot axis.

4. The towing hitch of claim 1, wherein the pivot axis is horizontal and transverse to a longitudinal direction of towing vehicle travel.

5. The towing hitch of claim 1, wherein the one or more compressible inserts are formed of a polymer material, wherein the shank and the head collectively define at least one pocket for holding the one or more compressible inserts, the at least one pocket substantially shielding the one or more compressible inserts from sunlight.

6. The towing hitch of claim 1, wherein the head is attached to the shank with a pivot axis pin, the pivot axis pin being rotationally fixed relative to one of the shank and the head.

7. The towing hitch of claim 1, wherein the one or more compressible inserts have a complex geometric profile to match a profile of a space between the shank and the head, and wherein the one or more compressible inserts are cast or molded of a polymer material.

8. A towing hitch to transmit a towing force between a towing vehicle and a towed load, the towing hitch comprising:

a shank formed of metal for attachment to a receiver on the towing vehicle, the shank defining a pivot axis, the shank providing a first biasing surface and a second biasing surface;

a head formed of metal separate from the shank which is attachable to the shank for limited pivoting in either a clockwise direction or a counterclockwise direction about the pivot axis during towing, the head providing a third biasing surface and a fourth biasing surface, the head comprising a tongue member mounted on a head member at any of a plurality of positions, wherein the tongue member is mounted on the head member using a plurality of bolts extending through bolt openings on the tongue member and bolt openings on the head member, each bolt having an insertion clearance relative to at least one of its bolt openings;

one or more compressible inserts, formed of a material substantially more compressible than the metals of the shank and the head, disposed between the shank and the head, such that pivoting of the head relative to the shank in the clockwise direction compresses the one or more compressible inserts between the first biasing surface and the third biasing surface, and such that pivoting of the head relative to the shank in the counterclockwise direction compresses the one or more compressible inserts between the second biasing surface and the fourth biasing surface;

a tow ball supported by the head and mounted on the tongue member of the head; and a compressible bumper disposed between the tongue member and the head member with a compression force provided by the compressible bumper taking up the insertion clearance.

9. A towing hitch to transmit a towing force between a towing vehicle and a towed load, the towing hitch comprising:

a shank formed of metal for attachment to a receiver on the towing vehicle, the shank defining a pivot axis, the shank providing a first biasing surface and a second biasing surface, wherein the first and second biasing surfaces each extend generally radially relative to the pivot axis;

a head formed of metal separate from the shank which is attachable to the shank for limited pivoting in either a clockwise direction or a counterclockwise direction about the pivot axis during towing, the head providing a third biasing surface and a fourth biasing surface, wherein the third and fourth biasing surfaces each extend generally radially relative to the pivot axis;

one or more compressible inserts, formed of a material substantially more compressible than the metals of the shank and the head, disposed between the shank and the head, such that pivoting of the head relative to the shank in the clockwise direction compresses the one or more compressible inserts between the first biasing surface and the third biasing surface, and such that pivoting of the head relative to the shank in the counterclockwise direction compresses the one or more compressible inserts between the second biasing surface and the fourth biasing surface; and a tow ball supported by the head rearward of the pivot axis;

wherein the first and third biasing surfaces are above the pivot axis, and wherein the second and fourth biasing surfaces are below the pivot axis, such that pivoting of the head relative to the shank in the clockwise and counterclockwise directions involves vertical movement of the tow ball in an arc about the pivot axis.

10. The towing hitch of claim 9, wherein respective shapes of the shank and head provide a maximum upward stop where the head abuts the shank at a location above the pivot axis and a maximum downward stop where the head abuts the shank at a location below the pivot axis, wherein the maximum downward stop positions the tow ball further below an unloaded rest position that the maximum upward stop positions the tow ball above the unloaded rest position.

11. The towing hitch of claim 9, wherein a force on the tow ball in the range of 1000 to 5000 pounds, oriented to maximize pivoting of the head relative to the shank, causes a pivoting within the range of 1 to 5 degrees.

12. The towing hitch of claim 9, wherein the one or more compressible inserts are formed of a polymer material, wherein the shank and the head collectively define at least one pocket for holding the one or more compressible inserts, the at least one pocket substantially shielding the one or more compressible inserts from sunlight.

13. A towing hitch to transmit a towing force between a towing vehicle and a towed load, the towing hitch comprising:

a shank formed of metal for attachment to a receiver on the towing vehicle, the shank defining a pivot axis, the shank providing a first biasing surface and a second biasing surface, wherein the first and second biasing surfaces each extend generally radially relative to the pivot axis;

a head formed of metal separate from the shank which is attachable to the shank for limited pivoting in either a clockwise direction or a counterclockwise direction about the pivot axis during towing, the head providing a third biasing surface and a fourth biasing surface, wherein the third and fourth biasing surfaces each extend generally radially relative to the pivot axis;

one or more compressible inserts, formed of a material substantially more compressible than the metals of the shank and the head, disposed between the shank and the head, such that pivoting of the head relative to the shank in the clockwise direction compresses the one or more compressible inserts between the first biasing surface and the third biasing surface, and such that pivoting of the head relative to the shank in the counterclockwise direction compresses the one or more compressible inserts between the second biasing surface and the fourth biasing surface; and a tow ball supported by the head above or below the pivot axis;

wherein the first and third biasing surfaces are behind the pivot axis, and wherein the second and fourth biasing surfaces are in front of the pivot axis, such that pivoting of the head relative to the shank in the clockwise and counterclockwise directions involves horizontal movement of the tow ball in an arc about the pivot axis.

14. The towing hitch of claim 13, wherein a force on the tow ball in the range of 1000 to 5000 pounds, oriented to maximize pivoting of the head relative to the shank, causes a pivoting within the range of 1 to 5 degrees.

15. A towing hitch to transmit a towing force between a towing vehicle and a towed load, the towing hitch comprising:

a shank formed of metal for attachment to a receiver on the towing vehicle, the shank defining a pivot axis, the shank providing a first biasing surface and a second biasing surface;

a head formed of metal separate from the shank which is attachable to the shank for limited pivoting in either a clockwise direction or a counterclockwise direction about the pivot axis during towing, the head providing a third biasing surface and a fourth biasing surface; and one or more compressible inserts, formed of a material substantially more compressible than the metals of the shank and the head, disposed between the shank and the head, such that pivoting of the head relative to the shank in the clockwise direction compresses the one or more compressible inserts between the first biasing surface and the third biasing surface, and such that pivoting of the head relative to the shank in the counterclockwise direction compresses the one or more compressible inserts between the second biasing surface and the fourth biasing surface, wherein the one or more compressible inserts are formed of polyurethane with a Shore hardness in the range of 75 to 85 Shore A; with each of the first, second, third and fourth biasing surfaces each extending within a range of 20 to 200 mm from the pivot axis.

16. The towing hitch of claim 15, further comprising: a tow ball supported by the head.

17. The towing hitch of claim 16, wherein a force on the tow ball in the range of 1000 to 5000 pounds, oriented to maximize pivoting of the head relative to the shank, causes a pivoting within the range of 1 to 5 degrees.

18. The towing hitch of claim 15, wherein the shank and the head collectively define at least one pocket for holding the one or more compressible inserts, the at least one pocket substantially shielding the one or more compressible inserts from sunlight.

19. A towing hitch to transmit a towing force between a towing vehicle and a towed load, the towing hitch comprising:

a shank formed of metal for attachment to a receiver on the towing vehicle, the shank defining a pivot axis, the shank providing a first biasing surface and a second biasing surface;

a head formed of metal separate from the shank which is attachable to the shank for limited pivoting in either a clockwise direction or a counterclockwise direction about the pivot axis during towing, the head providing a third biasing surface and a fourth biasing surface, wherein the head is attached to the shank with a pivot axis pin, the pivot axis pin being rotationally fixed relative to one of the shank and the head;

one or more compressible inserts, formed of a material substantially more compressible than the metals of the shank and the head, disposed between the shank and the head, such that pivoting of the head relative to the shank in the clockwise direction compresses the one or more compressible inserts between the first biasing surface and the third biasing surface, and such that pivoting of the head relative to the shank in the counterclockwise direction compresses the one or more compressible inserts between the second biasing surface and the fourth biasing surface; and a grease zerk for the pivot axis pin, to assist in pivoting of the other of the shank and the head relative to the pivot axis pin.

20. The towing hitch of claim 19, further comprising: a tow ball supported by the head.

* * * * *